(12) United States Patent
Kwak et al.

(10) Patent No.: US 11,336,934 B2
(45) Date of Patent: **\*May 17, 2022**

(54) BROADCAST SIGNAL TRANSMITTING/RECEIVING APPARATUS AND METHOD

(71) Applicant: LG ELECTRONICS INC., Seoul (KR)

(72) Inventors: Minsung Kwak, Seoul (KR); Seungryul Yang, Seoul (KR); Woosuk Ko, Seoul (KR)

(73) Assignee: LG Electronics Inc., Seoul (KR)

( \* ) Notice: Subject to any disclaimer, the term of this patent is extended or adjusted under 35 U.S.C. 154(b) by 0 days.

This patent is subject to a terminal disclaimer.

(21) Appl. No.: 17/102,248

(22) Filed: Nov. 23, 2020

(65) Prior Publication Data

US 2021/0112290 A1    Apr. 15, 2021

Related U.S. Application Data

(63) Continuation of application No. 16/301,697, filed as application No. PCT/KR2017/005692 on May 31, 2017, now Pat. No. 10,848,798.

(Continued)

(51) Int. Cl.
*H04N 21/2362* (2011.01)
*H04N 21/2381* (2011.01)
(Continued)

(52) U.S. Cl.
CPC ..... *H04N 21/2362* (2013.01); *H04N 21/2381* (2013.01); *H04N 21/26283* (2013.01);
(Continued)

(58) Field of Classification Search
CPC .......... H04N 21/2362; H04N 21/2381; H04N 21/26283; H04N 21/4312; H04N 21/4383;
(Continued)

(56) References Cited

U.S. PATENT DOCUMENTS 10,045,068 B2    8/2018   Eyer ................... H04N 21/4345
10,848,798 B2 \*  11/2020  Kwak ................. H04N 21/4312
(Continued)

FOREIGN PATENT DOCUMENTS

WO    2016-072725 A1    5/2016
WO    2016-076623 A1    5/2016
WO    2016-080803 A1    5/2016

OTHER PUBLICATIONS

ATSC, "ATSC Candidate Standard: Signaling, Delivery, Synchronization, and Error Protection (A/331", DOC S33-174RI, pp. 1-123, Jan. 5, 2016.

*Primary Examiner* — James R Sheleheda
(74) *Attorney, Agent, or Firm* — Dentons US LLP

(57) ABSTRACT

Disclosed is a broadcast signal transmitting method. A broadcast signal transmitting method according to an embodiment of the present invention may comprise: generating low level signaling (LLS) information; processing the LLS information into IP packets; generating link layer packets by link layer processing the IP packets; and generating a broadcast signal by physical layer processing the link layer packets.

18 Claims, 22 Drawing Sheets

Related U.S. Application Data

(60) Provisional application No. 62/426,577, filed on Nov. 27, 2016, provisional application No. 62/414,801, filed on Oct. 31, 2016, provisional application No. 62/410,832, filed on Oct. 20, 2016, provisional application No. 62/397,334, filed on Sep. 20, 2016, provisional application No. 62/344,372, filed on Jun. 1, 2016.

(51) Int. Cl.
  *H04N 21/262* (2011.01)
  *H04N 21/438* (2011.01)
  *H04N 21/858* (2011.01)
  *H04N 21/4725* (2011.01)
  *H04N 21/431* (2011.01)
  *H04N 21/472* (2011.01)

(52) U.S. Cl.
  CPC ..... *H04N 21/4312* (2013.01); *H04N 21/4383* (2013.01); *H04N 21/472* (2013.01); *H04N 21/4725* (2013.01); *H04N 21/8586* (2013.01)

(58) Field of Classification Search
  CPC ............. H04N 21/472; H04N 21/4725; H04N 21/8586
  See application file for complete search history.

(56) References Cited

U.S. PATENT DOCUMENTS

| | | | |
|---|---|---|---|
| 2007/0124359 A1 | 5/2007 | Hwang | H04H 60/72 709/200 |
| 2009/0013351 A1 | 1/2009 | Liao | H04N 7/17318 725/39 |
| 2009/0253416 A1 | 10/2009 | Lee | H04H 60/72 455/414.1 |
| 2009/0282372 A1 | 11/2009 | Jerding | H04N 21/482 715/867 |
| 2010/0037258 A1 | 2/2010 | Chitturi | H04N 21/234318 725/39 |
| 2010/0064313 A1 | 3/2010 | Beyabani | H04N 21/47214 725/38 |
| 2010/0161757 A1 | 6/2010 | Suh | H04N 21/4345 709/217 |
| 2011/0060791 A1 | 3/2011 | Lee | G06O 30/0603 709/203 |
| 2011/0103300 A1 | 5/2011 | Vare | H04N 21/64315 370/328 |
| 2011/0111795 A1 | 5/2011 | Hong | H04N 21/41407 455/556.1 |
| 2011/0283303 A1 | 11/2011 | Jung et al. | |
| 2012/0226775 A1 | 9/2012 | Suh | H04N 21/4345 709/217 |
| 2012/0324513 A1 | 12/2012 | Hwang | H04H 20/65 725/54 |
| 2013/0039278 A1 | 2/2013 | Bouazizi | H04L 65/4076 370/328 |
| 2013/0047178 A1 | 2/2013 | Moon | H04N 21/482 725/25 |
| 2013/0179995 A1 | 7/2013 | Basile | G06F 21/10 726/32 |
| 2015/0103729 A1 | 4/2015 | Hwang | H04W 72/005 370/312 |
| 2017/0134782 A1 | 5/2017 | Yamane | H04N 21/472 |
| 2017/0150328 A1* | 5/2017 | Hwang | H04W 48/10 |
| 2017/0195696 A1 | 7/2017 | Yamagishi | H04N 21/25891 |
| 2018/0048932 A1 | 2/2018 | Eyer | H04N 21/64322 |
| 2018/0098111 A1 | 4/2018 | Yang | H04N 13/167 |
| 2018/0139476 A1* | 5/2018 | Deshpande | H04N 21/435 |
| 2018/0139495 A1 | 5/2018 | Eyer | H04N 21/4622 |
| 2018/0152256 A1 | 5/2018 | Deshpande | H04H 60/82 |
| 2018/0176654 A1 | 6/2018 | Song | H04N 21/8133 |
| 2018/0254940 A1* | 9/2018 | Kwak | H04L 65/607 |
| 2018/0278986 A1 | 9/2018 | Paila | H04N 21/235 |
| 2018/0302665 A1 | 10/2018 | Eyer | H04N 21/4345 |
| 2019/0109659 A1 | 4/2019 | Deshpande | H04H 60/72 |
| 2019/0261253 A1 | 8/2019 | Deshpande | H04W 76/11 |

* cited by examiner

[Figure 1]
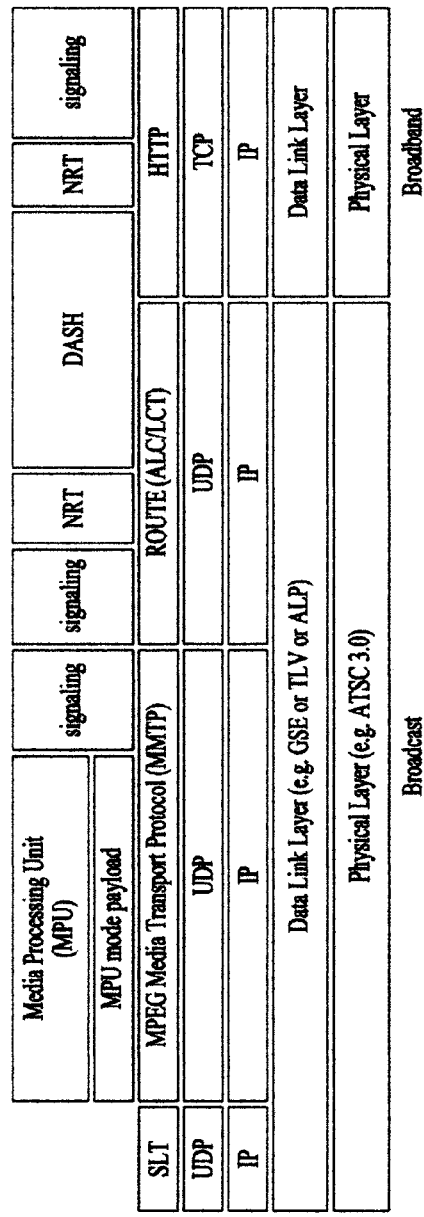

[Figure 2]
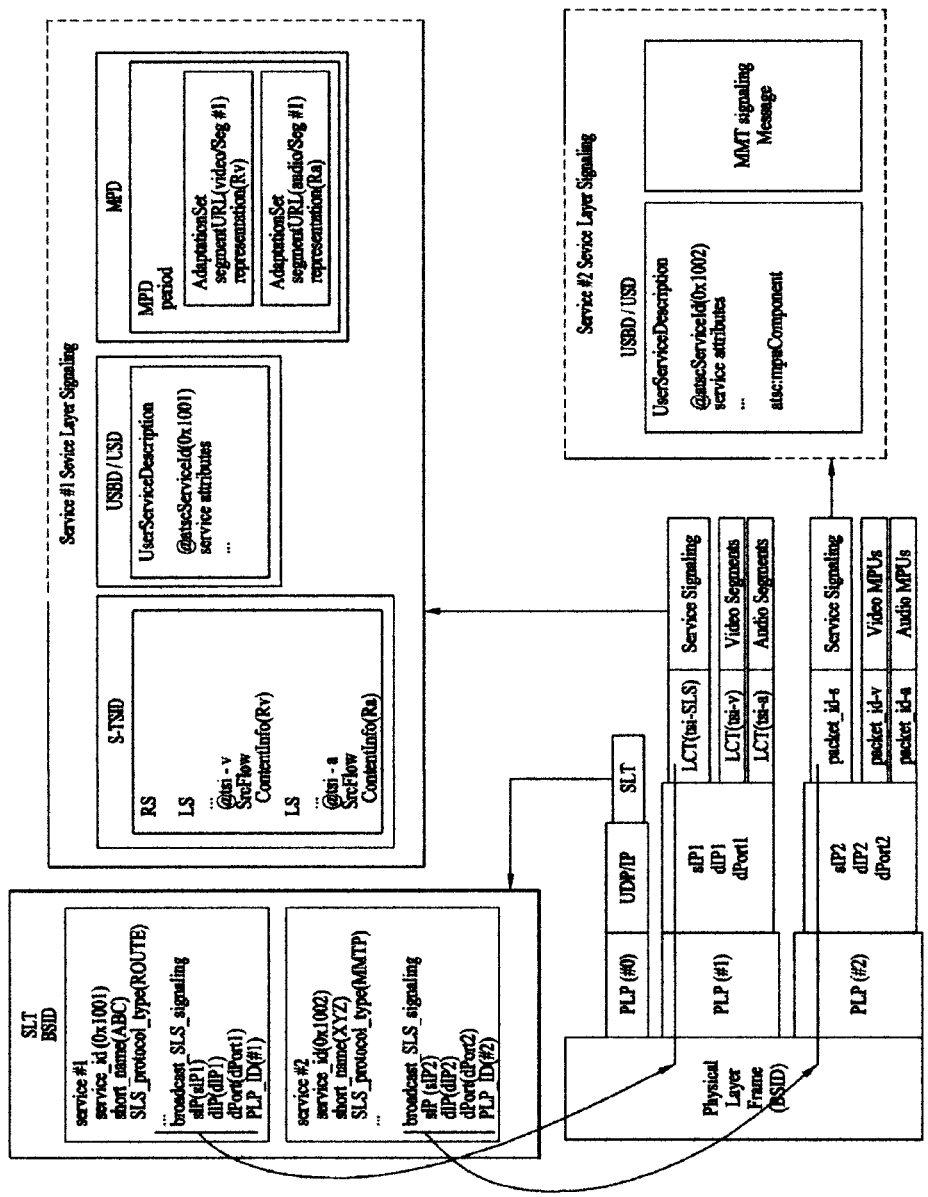

【Figure 3】

| Syntax | No. of Bits | Format |
|---|---|---|
| LLS_table() { | | |
|    LLS_table_id | 8 | uimsbf |
|    provider_id | 8 | uimsbf |
|    LLS_table_version | 8 | uimsbf |
|    switch (LLS_table_id) { | | |
|      case 0x01: | | |
|        SLT | var | Sec. 6.3 |
|        break; | | |
|      case 0x02: | | |
|        RRT | var | See Annex F |
|        break; | | |
|      case 0x03: | | |
|        System Time | var | Sec. 6.4 |
|        break; | | |
|      case 0x04: | | |
|        CAP | var | Sec. 6.5 |
|        break; | | |
|      default: | | |
|        reserved | var | |
|    } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1...999 |
|     @minorChannelNo | 0..1 | 1...999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcSignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

[Figure 4]

| Element or Attribute Name | | | | Use | Data Type |
|---|---|---|---|---|---|
| bundleDescription | | | | | |
| | userServiceDescription | | | | |
| | | @globalServiceID | | 1 | anyURL |
| | | @serviceID | | 1 | unsignedShort |
| | | @serviceStatus | | 0..1 | boolean |
| | | @fullMPDUri | | 1 | anyURL |
| | | @sTSIDUri | | 1 | anyURL |
| | | name | | 0..N | string |
| | | | @lang | 1 | language |
| | | serviceLanguage | | 0..N | language |
| | | capabilityCode | | 0..1 | string |
| | | deliveryMethod | | 1..N | |
| | | | broadcastAppService | 1..N | |
| | | | | basePattern | 1..N | string |
| | | | unicastAppService | 0..N | |
| | | | | basePattern | 1..N | string |

← t4010

| Element or Attribute Name | | Use | Data Type |
|---|---|---|---|
| S-TSID | | | |
| | @serviceID | 1 | unsignedShort |
| | RS | 1..N | |
| | | @bsid | 0..1 | unsignedShort |
| | | @slpAddr | 0..1 | string |
| | | @dIpAddr | 0..1 | string |
| | | @dport | 0..1 | unsignedShort |
| | | @PLPID | 0..1 | unsignedByte |
| | | LS | 1..N | |
| | | | @tsi | 1 | unsignedInt |
| | | | @PLPID | 0..1 | unsignedByte |
| | | | @bw | 0..1 | unsignedInt |
| | | | @startTime | 0..1 | dateTime |
| | | | @endTime | 0..1 | dateTime |
| | | | SrcFlow | 0..1 | srcFlowType |
| | | | RepairFlow | 0..1 | rprFlowType | t4020

【Figure 5】

| Element or Attribute Name | Use |
|---|---|
| bundleDescription | |
|   userServiceDescription | |
|     @globalServiceID | M |
|     @serviceID | M |
|     Name | 0..N |
|       @lang | CM |
|     serviceLanguage | 0..N |
|     contentAdvisoryRating | 0..1 |
|     Channel | 1 |
|       @serviceGenre | 0..1 |
|       @serviceIcon | 1 |
|       ServiceDescription | 0..N |
|         @serviceDescrText | 1 |
|         @serviceDescrLang | 0..1 |
|     mpuComponent | 0..1 |
|       @mmtPackageId | 1 |
|       @nextMmtPackageId | 0..1 |
|     routeComponent | 0..1 |
|       @sTSIDUri | 1 |
|       @sTSIDDestinationIpAddress | 0..1 |
|       @sTSIDDestinationUdpPort | 1 |
|       @sTSIDSourceIpAddress | 1 |
|       @sTSIDMajorProtocolVersion | 0..1 |
|       @sTSIDMinorProtocolVersion | 0..1 |
|     broadbandComponent | 0..1 |
|       @fullMPDUri | 1 |
|     ComponentInfo | 1..N |
|       @ComponentType | 1 |
|       @ComponentRole | 1 |
|       @ComponentProtectedFlag | 0..1 |
|       @ComponentId | 1 |
|       @ComponentName | 0..1 |

[Figure 6]
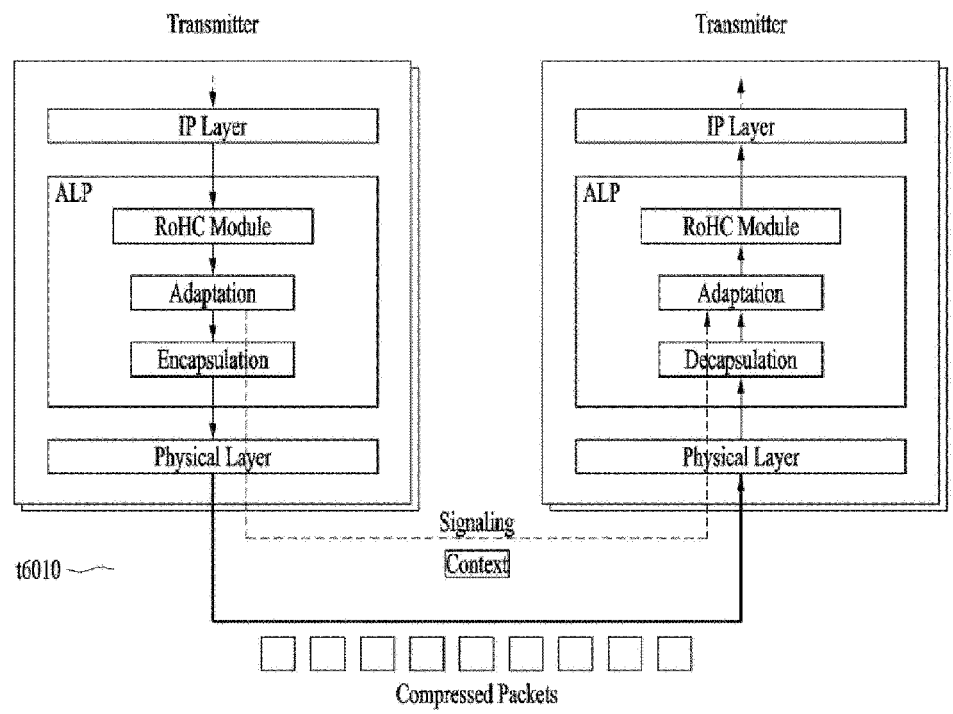
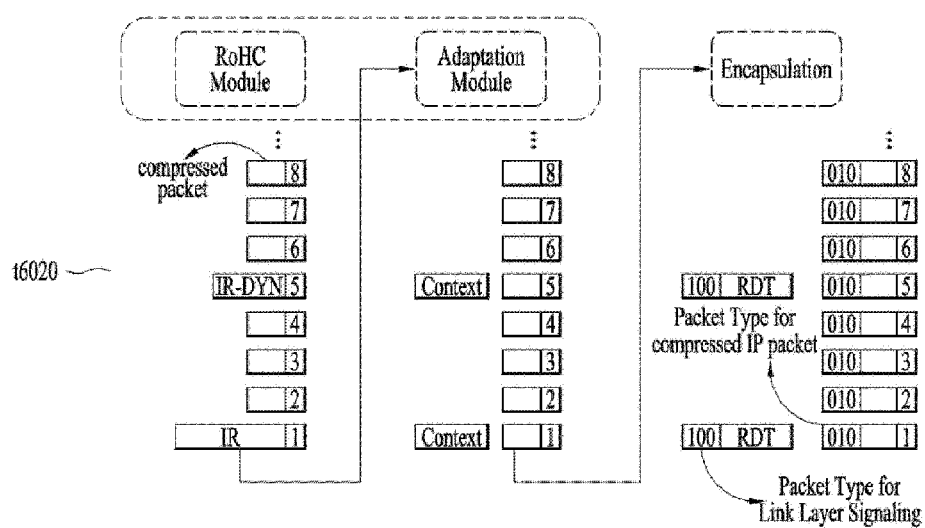

[Figure 7]

| Syntax | Number of bits | Format |
|---|---|---|
| Link_Mapping_Table() { | | |
|     signaling_type | 8 | 0x01 |
|     PLP_ID | 6 | uimsbf |
|     reserved | 2 | "11" |
|     num_session | 8 | uimsbf |
|     for(i = 0 ; i < num_session ; i++) { | | |
|         src_IP_add | 32 | uimsbf |
|         dst_IP_add | 32 | uimsbf |
|         src_UDP_port | 16 | uimsbf |
|         dst_UDP_port | 16 | uimsbf |
|         SID_flag | 1 | bslbf |
|         compressed_flag | 1 | bslbf |
|         reserved | 6 | '111111' |
|         if (SID_flag == "1") { | | |
|             SID | 8 | uimsbf |
|         } | | |
|         if (compressed_flag == "1') { | | |
|             context_id | 8 | uimsbf |
|         } | | |
|     } | | |
| } | | |

[Figure 8]
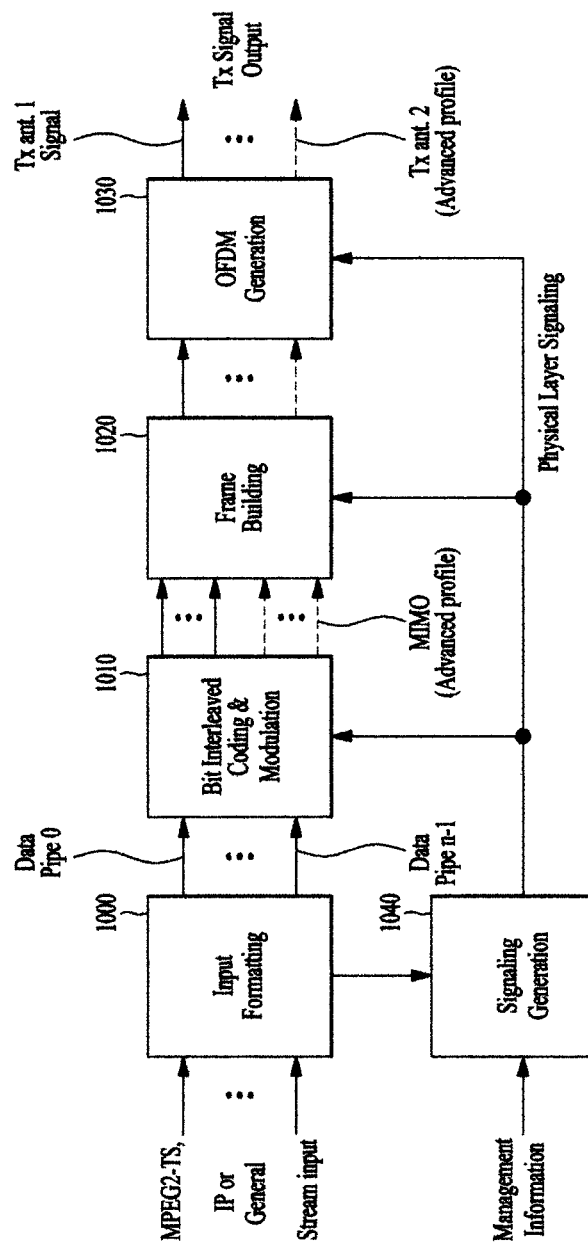

[Figure 9]
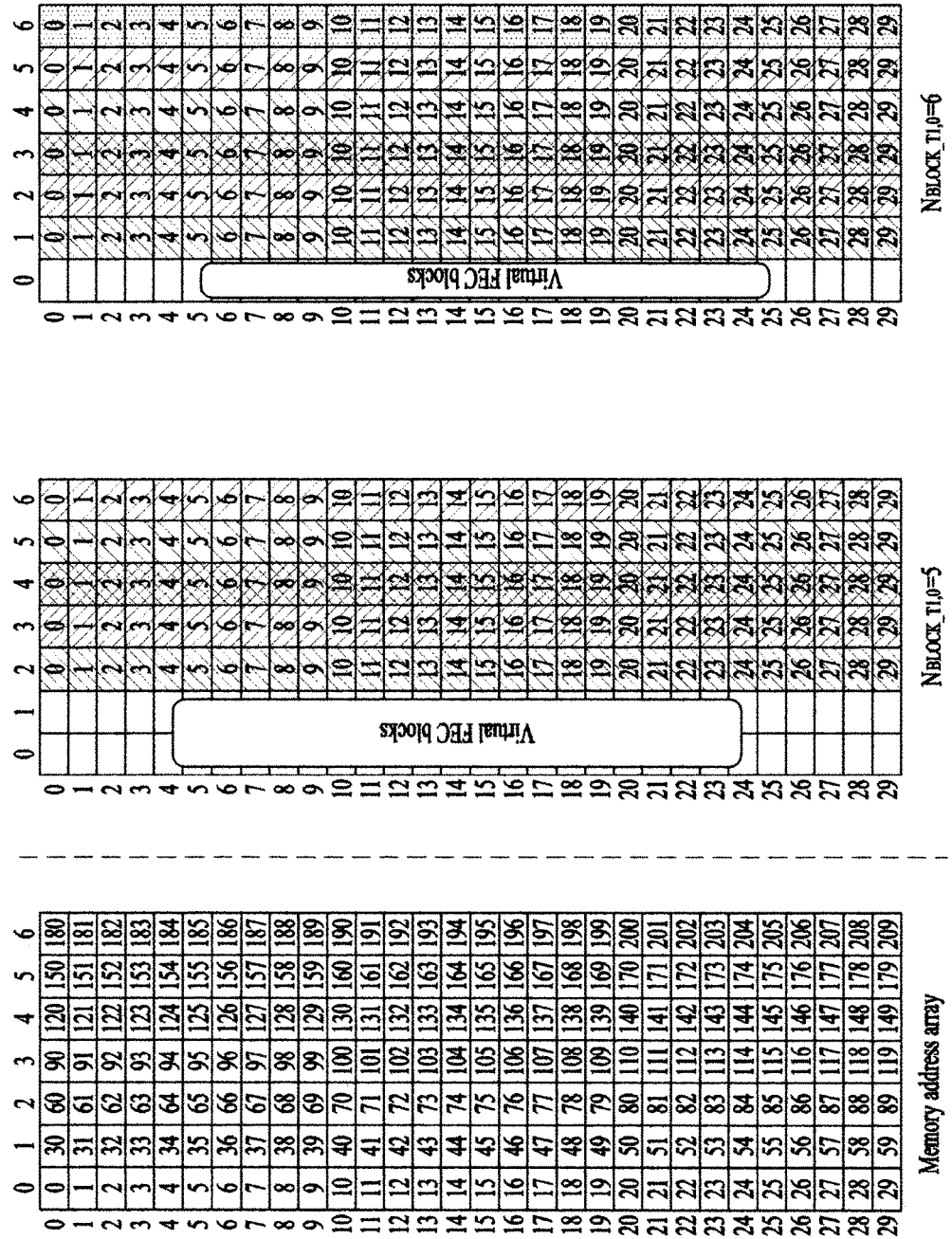

[Figure 10]
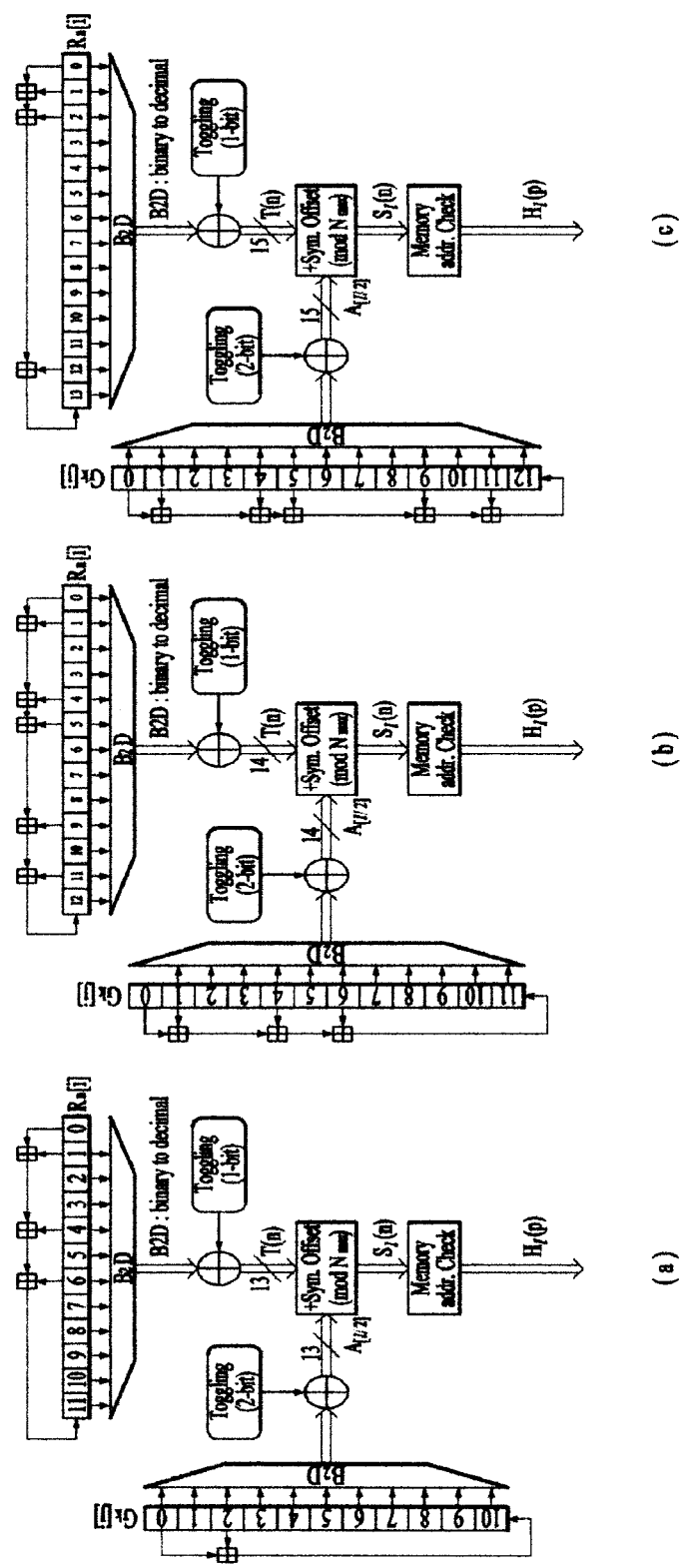

【Figure 11】

| Element or Attribute Name | | | | Use | Data Type |
|---|---|---|---|---|---|
| SLT | | | | | |
| | @bsid | | | 1 | unsignedShort string |
| | @sltCapabilities | | | 0..1 | anyURI |
| | sltInetUrl | | | 0..N | |
| | | @urlType | | 1 | unsignedByte |
| | Service | | | 1..N | |
| | | @serviceId | | 1 | unsignedShort |
| | | @sltSvcSeqNum | | 1 | unsignedByte |
| | | @protected | | 0..1 | boolean |
| | | @majorChannelNo | | 0..1 | 1..999 |
| | | @minorChannelNo | | 0..1 | 1..999 |
| | | @serviceCategory | | 1 | unsignedByte |
| | | @shortServiceName | | 0..1 | string |
| | | @hidden | | 0..1 | boolean |
| | | @broadbandAccessRequired | | 0..1 | boolean |
| | | @svcCapabilities | | 0..1 | string |
| | | @essential | | 0..1 | boolean |
| | | BroadcastSvcSignaling | | 0..1 | |
| | | | @slsProtocol | 1 | unsignedByte |
| | | | @slsMajorProtocolVersion | 1 | unsignedByte |
| | | | @slsMinorProtocolVersion | 1 | unsignedByte |
| | | | @slsPlpId | 0..1 | unsignedByte |
| | | | @slsDestinationIpAddress | 1 | string |
| | | | @slsDestinationUdpPort | 1 | unsignedShort |
| | | | @slsSourceIpAddress | 0..1 | string |
| | | svcInetUrl | | 0..N | anyURI |
| | | | @urlType | 1 | unsignedByte |
| | | OtherBsid | | 0..N | unsignedShort |
| | | | @type | 1 | string |
| | | | @essential | 0..1 | boolean |

[Figure 12]

| Element and Attribute Names | | | Use | Data Type |
|---|---|---|---|---|
| S-TSID | | | | |
| | @serviceId | | 0..1 | unsignedShort |
| | RS | | 1..N | |
| | | @sIpAddr | 0..1 | string |
| | | @dIpAddr | 0..1 | string |
| | | @dport | 0..1 | unsignedShort |
| | | LS | 1..N | |
| | | @tsi | 1 | unsignedInt |
| | | @bw | 0..1 | unsignedInt |
| | | @startTime | 0..1 | dateTime |
| | | @endTime | 0..1 | dateTime |
| | | SrcFlow | 0..1 | srcFlowType |
| | | RepairFlow | 0..1 | rprFlowType |

[Figure 13]
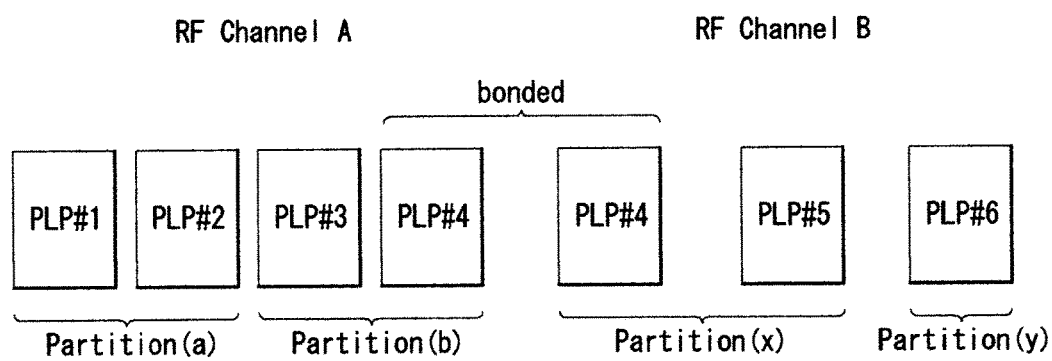

[Figure 14]
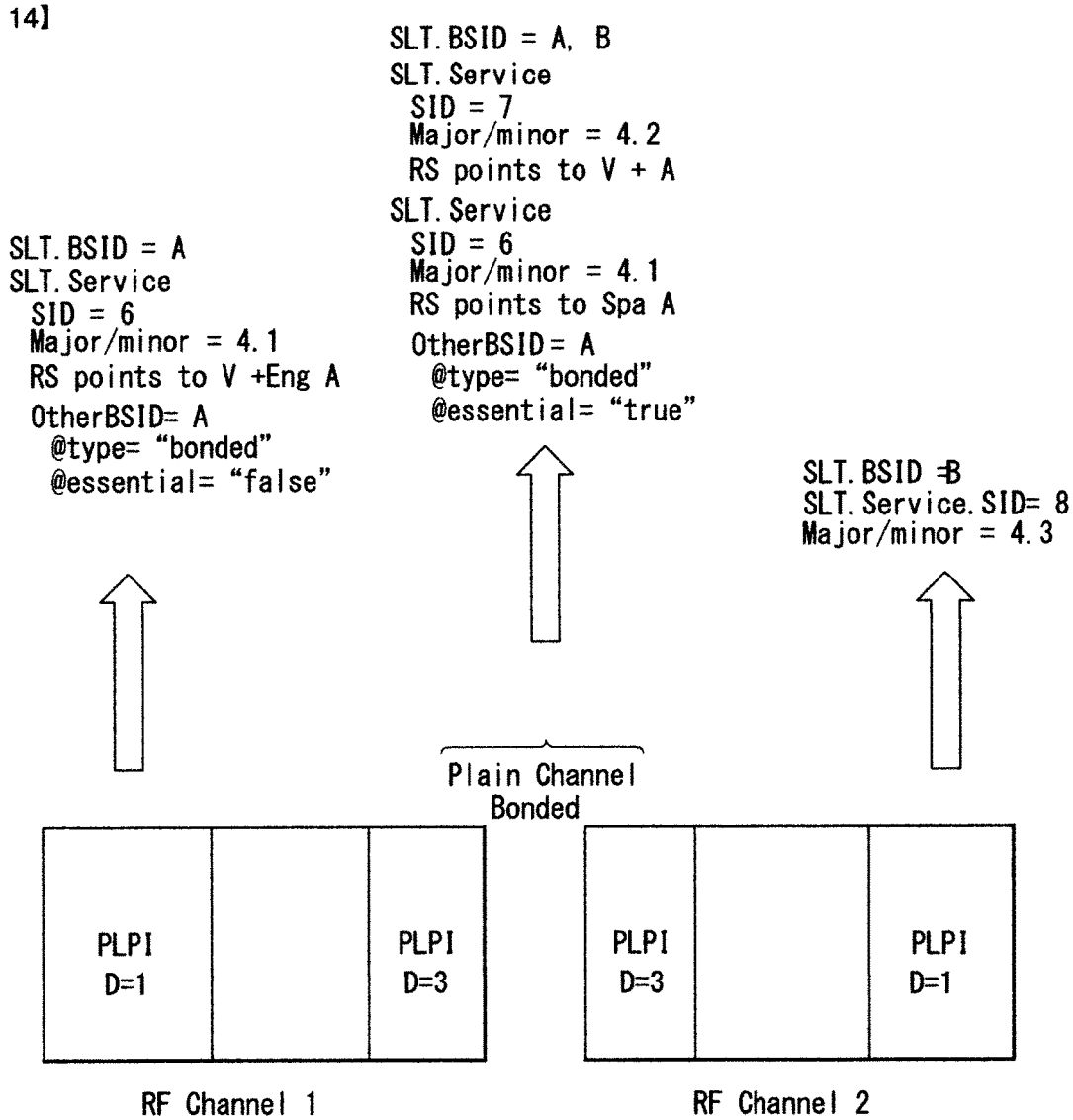

[Figure 15]

| Element or Attribute Name | | | | Use | Data Type |
|---|---|---|---|---|---|
| SLT | | | | | |
| | @bsid | | | 1 | unsignedShort |
| | @sltCapabilities | | | 0..1 | string |
| | sltInetUrl | | | 0..N | anyURI |
| | | @urlType | | 1 | unsignedByte |
| | Service | | | 1..N | |
| | | @serviceId | | 1 | unsignedShort |
| | | @sltSvcSeqNum | | 1 | unsignedByte |
| | | @protected | | 0..1 | boolean |
| | | @majorChannelNo | | 0..1 | 1..999 |
| | | @minorChannelNo | | 0..1 | 1..999 |
| | | @serviceCategory | | 1 | unsignedByte |
| | | @shortServiceName | | 0..1 | string |
| | | @hidden | | 0..1 | boolean |
| | | @broadbandAccessRequired | | 0..1 | boolean |
| | | @svcCapabilities | | 0..1 | string |
| | | @alternativeBsid | | 0..1 | unsignedShort |
| | | @alternativeServiceId | | 0..1 | unsignedShort |
| | | BroadcastSvcSignaling | | 0..1 | |
| | | | @slsProtocol | 1 | unsignedByte |
| | | | @slsMajorProtocolVersion | 1 | unsignedByte |
| | | | @slsMinorProtocolVersion | 1 | unsignedByte |
| | | | @slsPlpId | 0..1 | unsignedByte |
| | | | @slsDestinationIpAddress | 1 | string |
| | | | @slsDestinationUdpPort | 1 | unsignedShort |
| | | | @slsSourceIpAddress | 0..1 | string |
| | | svcInetUrl | | 0..N | anyURI |
| | | | @urlType | 1 | unsignedByte |

[Figure 16]

| urlType | Meaning |
|---|---|
| 0 | Reserved |
| 1 | URL of Service Layer Signaling Server (providing access to the Service Layer Signaling, as specified in Section 7). |
| 2 | URL of ESG server (providing access to the ESG data, as specified in A/332, Section 5.5.2 [4]) |
| 3 | URL of Service Usage Data Gathering Report server (for use in reporting service usage, as specified in A/333 [5]) |
| 4 | URL of Dynamic Event WebSocket Server (providing access to the dynamic events via WebSocket protocol, as specified in A/337 [47]). |
| Other values | Reserved for future use |

[Figure 17]

```
Service
    id
    version
    validFrom
    validTo
    globalServiceID
    weight
    emergency
    ServiceType
    Name
    Description
    AudioLanguage
        languageSDPTag
    TextLanguage
        languageSDPTag
    ContentAdvisoryRatings
    TargetUserProfile
    Genre
    BroadcastArea
    PrivateExt
        ATSC3ServiceExtension
            Icon
                MIMEType
                width
                height
                size
            MajorChannelNum
            MinorChannelNum
```

[Figure 18]

| Name | Type | Category | Card-inality | Description | Data Type |
|---|---|---|---|---|---|
| ATSC3ServiceExtension | E1 | NM/TM | 1 | Additional information about ATSC 3.0 service.<br>Contains the following elements:<br>Icon<br>MajorChannelNum<br>MinorChannelNum | |
| Icon | E2 | NM/TM | 0..N | URL pointing to an icon image used to represent the service in the ESG. Multiple URLs could be used to reference images of different width and height or different representation formats.<br>Contains the following optional attributes:<br>MIMEType,<br>width,<br>height,<br>size | anyURI |
| MIMEType | A | NM/TM | 0..1 | The optional MIME type of the icon allowing receivers to preemptively ignore fetching image types they are not capable of presenting. | String |
| width | A | NM/TM | 0..1 | Width of the referenced image in pixels | unsignedInt |
| height | A | NM/TM | 0..1 | Height of the referenced image in pixels | unsignedInt |
| size | A | NM/TM | 0..1 | Size of the image data in bytes. | unsignedInt |
| MajorChannelNum | E2 | NM/TM | 0..1 | Major channel number of the service.<br>The language is expressed using built-in XML attribute 'xml:lang' with this element. | String |
| MinorChannelNum | E2 | NM/TM | 0..1 | Minor channel number of the service.<br>The language is expressed using built-in XML attribute 'xml:lang' with this element. | String |

[Figure 19]

```
Content
    id
    version
    validFrom
    validTo
    globalContentID
    baseCID
    ServiceReference
        idRef
        weight
    Name
    Description
    AudioLanguage
        languageSDPTag
    TextLanguage
        languageSDPTag
    Length
    ContentAdvisoryRatings[Table 5.3]
    TargetUserProfile
    Genre
    BroadcastArea
    TermsOfUse
    Popularity
        rating
        noOfViews
        noOfDiscussions
        samplingDate
    Freshness
        releastDate
        broadcastDate
    PrivateExt
        Components language
            VideoComponent
                    language
            CCComponent
                    language
            AppComponent
                    language
        ContentIcon
            MIMEType
                width
                height
                size
        Preview
            PreviewIcon
                MIMEType
                width
                height
                size
            Description
            PreviewData
                MIMEType
                width
                height
                size
        Capabilities
```

【Figure 20】

| Name | Type | Category | Cardinality | Data Type |
|---|---|---|---|---|
| ContentIcon | E2 | NM/TM | 0..N | anyURI |
| MIMEType | A | NM/TM | 0..1 | String |
| width | A | NM/TM | 0..1 | unsignedInt |
| height | A | NM/TM | 0..1 | unsignedInt |
| size | A | NM/TM | 0..1 | unsignedInt |
| Preview | E2 | NM/TM | 0..N | |
| usage | A | NM/TM | 0..1 | |
| PreviewIcon | E3 | NM/TM | 0..N | anyURI |
| MIMEType | A | NM/TM | 0..1 | String |
| width | A | NM/TM | 0..1 | unsignedInt |
| height | A | NM/TM | 0..1 | unsignedInt |
| size | A | NM/TM | 0..1 | unsignedInt |
| Description | E3 | NM/TM | 1..N | |
| text | A | NM/TM | 1 | String |
| Xml:lang | A | NM/TM | 0..1 | String |
| SpeechInfoURI | E4 | NM/TM | 0..N | anyURI |
| content-type | A | NM/TM | 0..1 | String |
| content-enc | A | NM/TM | 0..1 | String |
| SpeechInfo | E4 | NM/TM | 0..N | anyURI |
| content-type | A | NM/TM | 0..1 | String |
| content-enc | A | NM/TM | 0..1 | String |
| PreviewData | E3 | NM/TM | 0..N | anyURI |
| MIMEType | A | NM/TM | 0..1 | String |
| width | A | NM/TM | 0..1 | unsignedInt |
| height | A | NM/TM | 0..1 | unsignedInt |
| size | A | NM/TM | 0..1 | unsignedInt |

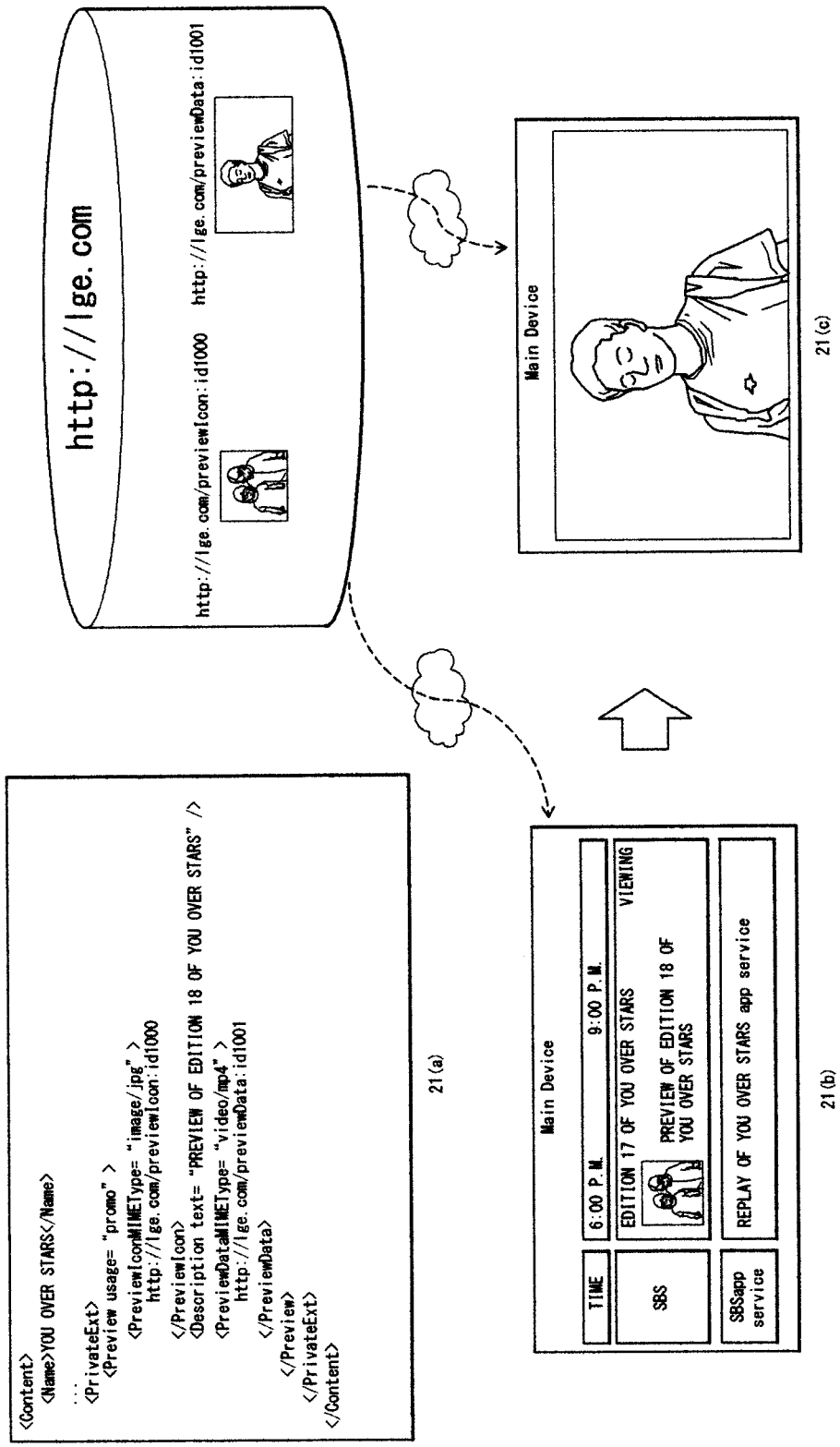

【Figure 22】
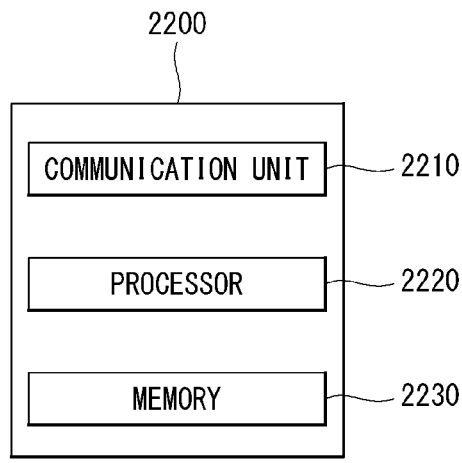
【Figure 23】
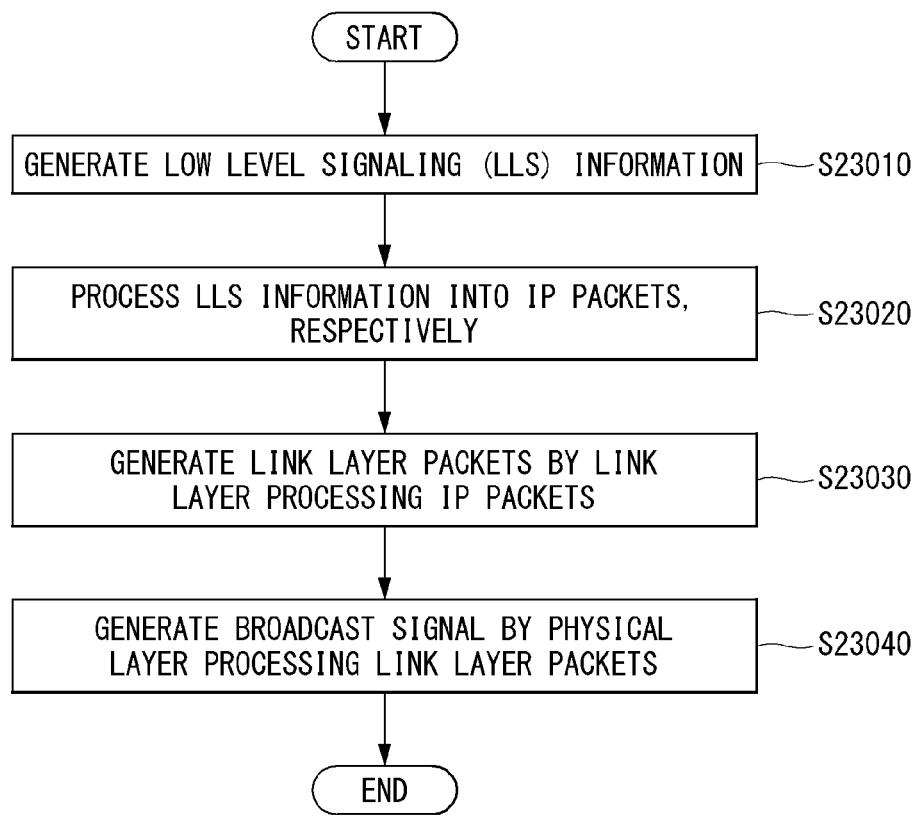

BROADCAST SIGNAL TRANSMITTING/RECEIVING APPARATUS AND METHOD

CROSS-REFERENCE TO RELATED APPLICATIONS

This application is a Continuation of U.S. application Ser. No. 16/301,697, filed Nov. 14, 2018, which is a National Stage filing under 35 U.S.C. 371 of International Application No. PCT/KR2017/005692, filed on May 31, 2017, which claims the benefit of U.S. Provisional Application No. 62/344,372, filed on Jun. 1, 2016, U.S. Provisional Application No. 62/397,334, filed on Sep. 20, 2016, U.S. Provisional Application No. 62/410,832, filed on Oct. 20, 2016, U.S. Provisional Application No. 62/414,801, filed on Oct. 31, 2016, and U.S. Provisional Application No. 62/426,577, filed on Nov. 27, 2016, the contents of which are all hereby incorporated by reference herein in their entirety.

TECHNICAL FIELD

The present invention relates to a broadcast signal transmitting apparatus, a broadcast signal receiving apparatus, a broadcast signal transmitting method, and a broadcast signal receiving method.

BACKGROUND ART

Various techniques for transmitting and receiving digital broadcasting signals have been developed as transmission of analog broadcasting signals is terminated. The digital broadcast signal may include a larger amount of video/audio data than the analog broadcast signal and may further include various kinds of additional data as well as video/audio data.

DISCLOSURE

Technical Problem

A digital broadcast system can provide high definition (HD) images, multi-channel audio, and various additional services. However, for digital broadcasting, data transmission efficiency for transmission of a large amount of data, robustness of a transmission/reception network, and network flexibility considering a mobile reception device should be enhanced.

Technical Solution

In order to achieve the technical objects, the present invention proposes a broadcast signal transmitting method and a broadcast signal transmitting apparatus.

A broadcast signal transmitting method according to an embodiment of the present invention includes: generating low level signaling (LLS) information, wherein the LLS information includes type ID information for identifying a type of the LLS information; processing the LLS information into IP packets; generating link layer packets by link layer processing the IP packets; and generating a broadcast signal by physical layer processing the link layer packets, in which the LLS information may include service list table (SLT) information according to the type ID information and the service list table information includes service information for a broadcast service and BSID information providing one or more broadcast stream IDs.

As an embodiment, when the broadcast service is delivered through channel bonding, the BSID information may include broadcast stream IDs of each RF channel included in the channel bonding.

As an embodiment, the service information may further include other BSID information indicating an ID of another broadcast stream including any one of a portion of the broadcast service or a duplicate of the broadcast service.

As an embodiment, the other BSID information may include type information indicating that another broadcast stream identified by the other BSID information includes the portion or the duplicate of the broadcast service.

As an embodiment, when the broadcast service has portions delivered in a plurality of RF channels, the service information may further include essential information indicating whether a portion included in the broadcast stream identified by the BSID is an essential portion of the broadcast service.

As an embodiment, the service list information may include URL information providing a basic URL for acquiring a file for the broadcast service through a broadband and the SLT URL information may include URL type information indicating a type of file available as the basic URL, and the URL type information may indicate that the basic URL is a URL of a service layer signaling server, a URL of an ESG server, a URL of a service use data collection report server, or a URL of a dynamic event web socket server according to a value of the URL type information.

As an embodiment, when the broadcast service is an electronic program guide (ESG) service, service data for the ESG service may include content information for contents of the broadcast service, and a content fragment may include preview information and the preview information may include preview icon information providing a URI pointing an icon image used for representing the preview information, description information providing a description of the preview information, and preview data information providing a URI pointing contents to be displayed as preview data for the content information.

A broadcast signal transmitter according to an embodiment of the present invention includes: a communication unit transmitting a broadcast signal; a memory storing data; and a processor controlling the communication unit and the memory, in which the broadcast signal transmitter may be configured to generate low level signaling (LLS) information, wherein the LLS information includes type ID information for identifying a type of the LLS information, process the LLS information into IP packets, generate link layer packets by link layer processing the IP packets, and generate the broadcast signal by physical layer processing the link layer packets, and the LLS information may include service list table (SLT) information according to the type ID information and the service list table information includes service information for a broadcast service and BSID information providing one or more broadcast stream IDs.

Advantageous Effects

The present invention can provide various broadcast services by processing data according to service characteristics and controlling quality of service (QoS) for each service or service component.

The present invention can achieve transmission flexibility by transmitting various broadcast services through the same radio frequency (RF) signal bandwidth.

According to the present invention, it is possible to provide broadcasting signal transmitting and receiving methods and broadcast signal transmitting and receiving apparatuses capable of receiving a digital broadcast signal without an error even when using a mobile receiving apparatus or in an indoor environment.

The present invention can effectively support a next generation broadcast service in an environment supporting a next generation hybrid broadcast using a terrestrial broadcasting network and an Internet network.

Hereinafter, additional advantages of the present invention can be described together with a constitution of the invention.

DESCRIPTION OF DRAWINGS

FIG. 1 is a diagram showing a protocol stack according to an embodiment of the present invention.

FIG. 2 is a diagram showing a service discovery procedure according to one embodiment of the present invention.

FIG. 3 is a diagram showing a low level signaling (LLS) table and a service list table (SLT) according to one embodiment of the present invention.

FIG. 4 is a diagram showing a USBD and an S-TSID delivered through ROUTE according to one embodiment of the present invention.

FIG. 5 is a diagram showing a USBD delivered through MMT according to one embodiment of the present invention.

FIG. 6 is a diagram showing link layer operation according to one embodiment of the present invention.

FIG. 7 is a diagram showing a link mapping table (LMT) according to one embodiment of the present invention.

FIG. 8 illustrates a configuration of a broadcast signal transmission apparatus for future broadcast services according to an embodiment of the present invention.

FIG. 9 illustrates a write operation of a time interleaver according to an embodiment of the present invention.

FIG. 10 illustrates an interleaving address generator including a main pseudo-random binary sequence (PRBS) generator and a sub-PRBS generator according to each FFT mode which are included in a frequency interleaver according to an embodiment of the present invention.

FIG. 11 illustrates SLT information according to an embodiment of the present invention.

FIG. 12 illustrates S-TSID information according to an embodiment of the present invention.

FIG. 13 illustrates one example of channel bonding and partitioning according to an embodiment of the present invention.

FIG. 14 is a diagram illustrating a method for delivering a service through channel bonding according to an embodiment of the present invention.

FIG. 15 illustrates SLT information according to another embodiment of the present invention.

FIG. 16 illustrates a code value for a URL type attribute of an SLT URL element of SLT information according to an embodiment of the present invention.

FIG. 17 illustrates a service fragment of a service guide according to an embodiment of the present invention.

FIG. 18 illustrates a service-level private extension element of a service fragment according to an embodiment of the present invention.

FIG. 19 illustrates a content fragment of a service guide according to an embodiment of the present invention.

FIG. 20 illustrates a content-level private extension element of a content fragment according to an embodiment of the present invention.

FIG. 21 illustrates a method for providing a preview on an electronic service guide (ESG) by a broadcast receiver according to an embodiment of the present invention.

FIG. 22 illustrates a configuration of a broadcast signal transmitter/receiver according to an embodiment of the present invention.

FIG. 23 illustrates a broadcast signal transmitting method according to an embodiment of the present invention.

BEST MODE

In what follows, preferred embodiments of the present invention are described in detail with reference to appended drawings. Detailed descriptions with reference to appended drawings are not necessarily limited only to the embodiments which may be implemented according to the present invention but rather intended to describe preferred embodiments of the present invention. The following descriptions given below include specific details for a thorough understanding of the present invention. However, it should be clearly understood by those skilled in the art that the present invention may be implemented without involving the specific details.

Most of the terms used in the present invention have been chosen among those terms widely accepted in the corresponding field. However, some of the terms are selected arbitrarily by the applicant and their meaning will be described in detail in the following descriptions if needed. Therefore, the present invention should be understood not by the apparent names or immediate meanings of the terms but by the intended meanings of the terms.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO or MIMO according to one embodiment. A non-MIMO scheme according to an embodiment of the present invention may include a multiple input single output (MISO) scheme, a single input single output (SISO) scheme, etc. The present invention proposes a physical profile (or system) optimized to minimize receiver complexity while attaining the performance required for a particular use case.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an slang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @slpAddr attribute, an @dlpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @slpAddr attribute, the @dlpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset_id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may employ a header compressor/decompressor and/or an adaptation module. The IP header compressor (RoHC compressor) may reduce the size of each IP packet header based on the RoHC scheme. Thereafter, the adaptation module may extract context information and generate signaling information from each packet stream. A receiver may parse signaling information associated with the packet stream and attach context information to the packet stream. The RoHC decompressor may restore the packet header to reconfigure an original IP packet. Hereinafter, IP header compression may mean only IP header compression by a header compression or a combination of IP header compression and an adaptation process by an adaptation module. The same is true in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may provide construction of link layer signaling using context information and/or configuration parameters. The adaptation function may use previous configuration parameters and/or context information to periodically transmit link layer signaling through each physical frame.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT shall be transmitted whenever the context information is changed. In addition, in some embodiments, the RDT shall be transmitted every physical frame. In order to transmit the RDT every physical frame, the previous RDT may be reused.

The receiver may select a first PLP and first acquire signaling information of the SLT, the RDT, the LMT, etc., prior to acquisition of a packet stream. When signaling information is acquired, the receiver may combine the signaling information to acquire mapping between service—IP information—context information—PLP. That is, the receiver may check which service is transmitted in which IP streams or which IP streams are delivered in which PLP and acquire context information of the PLPs. The receiver may select and decode a PLP carrying a specific packet stream. The adaptation module may parse context information and combine the context information with the compressed packets. To this end, the packet stream may be restored and delivered to the RoHC decompressor. Thereafter, decompression may start. At this time, the receiver may detect IR packets to start decompression from an initially received IR packet (mode 1), detect IR-DYN packets to start decompression from an initially received IR-DYN packet (mode 2) or start decompression from any compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be pre-defined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer session may also be referred to as multicast. Information on IP streams or transport sessions transmitted through a specific PLP may be acquired through the LMT. In contrast, information on through which PLP a specific transport session is delivered may be acquired.

The LMT may be delivered in any PLP identified as carrying LLS. Here, the PLP in which the LLS is delivered may be identified by an LLS flag of L1 detail signaling information of a physical layer. The LLS flag may be a flag field indicating whether the LLS is delivered in the PLP, each PLP. Here, L1 detail signaling information may correspond to the below-described PLS2 data.

That is, the LMT may be delivered in the same PLP along with the LLS. Each LMT shall describe mapping between PLPs and IP addresses/ports as described above. As described above, the LLS may include an SLT and the IP address/port described in the LMT may be any IP address/port associated with any service described in the SLT delivered in the same PLP as the LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments. In this case, the LMT may describe, in a PLP loop, PLPs for any IP address/port associated with any service described in the SLT delivered together, as described above.

The signaling_type field may indicate the type of signaling information delivered by the table. The value of signaling_type field for the LMT may be set to 0x01. The signaling_type field may be omitted. The PLP_ID field may identify a target PLP to be described. If the PLP loop is used, each PLP_ID field may identify each target PLP. The PLP_ID field and subsequent fields thereof may be included in the PLP loop. The below-described PLP_ID field is an identifier for one PLP of the PLP loop and the below-described fields may be fields for the corresponding PLP.

The num_session field may indicate the number of higher layer sessions delivered through the PLP identified by the corresponding PLP_ID field. According to the number indicated by the num_session field, information on each session may be included. This information may include a src_IP_add field, a dst_IP_add field, a src_UDP_port field, a dst_UDP_port field, an SID_flag field, a compressed_flag field, an SID field and/or a context_id field.

The src_IP_add field, the dst_IP_add field, the src_UDP_port field and the dst_UDP_port field may indicate the source IP address, the destination IP address, the source UDP port and the destination UDP port of the transport session among the higher layer sessions delivered through the PLP identified by the corresponding PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. If header compression is applied (compressed_flag=1), the RDT may be present and the PLP ID field of the RDT may have the same value as the PLP_ID field associated with this compressed_flag field.

The SID field may indicate the SIDs (sub stream IDs) of the link layer packets delivering the transport session. These link layer packets may include SIDs having the same values as this SID field in the optional header thereof. To this end, the receiver may filter link layer packets using LMT information and the SID information of the link layer packet header, without parsing all link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

FIG. 8 illustrates a configuration of a broadcast signal transmission apparatus for future broadcast services according to an embodiment of the present invention.

The broadcast signal transmission apparatus for future broadcast services according to the present embodiment may include an input formatting block 1000, a bit interleaved coding & modulation (BICM) block 1010, a frame building block 1020, an OFDM generation block 1030 and a signaling generation block 1040. Description will be given of an operation of each block of the broadcast signal transmission apparatus.

In input data according to an embodiment of the present invention, IP stream/packets and MPEG2-TS may be main input formats, and other stream types are handled as general streams.

The input formatting block 1000 may demultiplex each input stream into one or a plurality of data pipes, to each of which independent coding and modulation are applied. A DP is the basic unit for robustness control, which affects QoS. One or a plurality of services or service components may be carried by one DP. The DP is a logical channel in a physical layer for delivering service data or related metadata capable of carrying one or a plurality of services or service components.

Since QoS depends on characteristics of a service provided by the broadcast signal transmission apparatus for future broadcast services according to the embodiment of the present invention, data corresponding to respective services needs to be processed using different schemes.

BICM block 1010 may include a processing block for a profile (or system) to which MIMO is not applied, and a processing block for a profile (or system) to which MIMO is applied and may comprise a plurality blocks for processing each Data Pipe.

A processing block of the BICM block to which MIMO is not applied may include a data FEC encoder, a bit interleaver, a constellation mapper, a signal space diversity (SSD) encoding block and a time interleaver. A processing block of the BICM block to which MIMO is applied may is distinguished from the processing block of the BICM block to which MIMO is not applied in that the processing block further includes a cell-word demultiplexer and a MIMO encoding block The data FEC encoder performs FEC encoding on an input BBF to generate FECBLOCK procedure using outer coding (BCH) and inner coding (LDPC). The outer coding (BCH) is optional coding method. The bit interleaver may interleave outputs of the data FEC encoder to achieve optimized performance with a combination of LDPC codes and a modulation scheme while providing an efficiently implementable structure. A detailed operation of the bit interleaver will be described later. The constellation mapper may modulate each cell word from the bit interleaver or the cell-word demultiplexer in the advanced profile using either QPSK, QAM-16, non-uniform QAM (NUQ-64, NUQ-256, or NUQ-1024) or non-uniform constellation (NUC-16, NUC-64, NUC-256, or NUC-1024) mapping to give a power-normalized constellation point. This constellation mapping is applied only for DPs. It is observed that QAM-16 and NUQs are square shaped, while NUCs have arbitrary shapes. Both NUQs and NUCs are defined specifically for each code rate and the particular one used is signaled by the parameter DP_MOD field in the PLS2 data. The time interleaver may operates at a DP level. Parameters of time interleaving (TI) may be set differently for each DP. The time interleaver according to an embodiment of the present invention can be positioned between a BICM chain block and a frame builder.

Here, the time interleaver according to an embodiment of the present invention can use both a convolutional interleaver (CI) and a block interleaver (BI) or selectively using either the CI or the BI according to a physical layer pipe (PLP) mode. A PLP according to an embodiment of the present invention is a physical path corresponding to the same concept as that of the above-described DP, and a name of the PLP may be changed by a designer. A PLP mode according to an embodiment of the present invention may include a single PLP mode or a multi-PLP mode according to the number of PLPs processed by a broadcast signal transmitter or a broadcast signal transmission apparatus. In the present invention, time interleaving in which different time interleaving schemes are applied according to PLP modes may be referred to as hybrid time interleaving.

The hybrid time interleaver may include a BI and a CI. That is, when PLP_NUM=1, the BI is not applied (BI is turned OFF) and only the CI is applied. When PLP_NUM>1, both the BI and the CI may be applied (BI is turned ON). A structure and an operation of the CI applied when PLP_NUM>1 may be different from a case of PLP_NUM=1. The hybrid time deinterleaver may perform an operation corresponding to an inverse operation of the hybrid time interleaver described above.

The cell-word demultiplexer is used for dividing a single cell-word stream into dual cell-word streams for MIMO processing. The MIMO encoding block may process an output of the cell-word demultiplexer using a MIMO encoding scheme. The MIMO encoding scheme of the present invention may be defined as full-rate spatial multiplexing (FR-SM) to provide capacity increase with relatively small complexity increase at the receiver side. MIMO processing is applied at the DP level. NUQ ($e_{1,i}$ and $e_{2,i}$) corresponding to a pair of constellation mapper outputs is fed to an input of a MIMO encoder and paired MIMO encoder output (g1,i and g2,i) is transmitted by the same carrier k and OFDM symbol l of respective TX antennas thereof.

The frame building block 1020 may map the data cells of the input DPs into the OFDM symbols within a frame, and perform frequency interleaving for frequency-domain diversity.

A frame according to an embodiment of the present invention is further divided into a preamble, one or more frame signaling symbols (FSSs), normal data symbols. The preamble provides a set of basic transmission parameters for efficient transmission and reception of a signal. And the preamble indicates whether the emergency alert service (EAS) is provided in a current frame or not. A main purpose of the FSS is to carry PLS data. For fast synchronization and channel estimation, and hence fast decoding of PLS data, the FSS has a dense pilot pattern than a normal data symbol.

The frame building block 1020 may include a delay compensation block for adjusting timing between DPs and corresponding PLS data to ensure that the DPs and the corresponding PLS data are co-timed at a transmitter side, a cell mapper for mapping PLS, DPs, auxiliary streams, dummy cells, etc. to active carriers of the OFDM symbols in the frame and a frequency interleaver.

The frequency interleaver may randomly interleave data cells received from the cell mapper to provide frequency diversity. In addition, the frequency interleaver may operate on data corresponding to an OFDM symbol pair including two sequential OFDM symbols or an OFDM symbol using a different interleaving-seed order to obtain maximum interleaving gain in a single frame.

The OFDM generation block 1030 modulates OFDM carriers by cells produced by the frame building block, inserts pilots, and produces a time domain signal for transmission. In addition, this block subsequently inserts guard intervals, and applies peak-to-average power ratio (PAPR) reduction processing to produce a final RF signal.

The signaling generation block 1040 may create physical layer signaling information used for an operation of each functional block. Signaling information according to an embodiment of the present invention may include PLS data. The PLS data includes PLS1 data and PLS2 data.

The PLS1 data is a first set of PLS data carried in an FSS symbol in a frame having a fixed size, coding and modulation, which carries basic information about the system in addition to the parameters needed to decode the PLS2 data. The PLS1 data provides basic transmission parameters including parameters required to enable reception and decoding of the PLS2 data. In addition, the PLS1 data remains constant for the duration of a frame group. The PLS2 data is a second set of PLS data transmitted in an FSS symbol, which carries more detailed PLS data about the system and the DPs. The PLS2 contains parameters that provide sufficient information for the receiver to decode a desired DP. The PLS2 signaling further includes two types of parameters, PLS2 static data (PLS2-STAT data) and PLS2 dynamic data (PLS2-DYN data). The PLS2 static data is PLS2 data that remains static for the duration of a frame group and the PLS2 dynamic data is PLS2 data that dynamically changes frame by frame.

PLS2 data can include FIC flag information. FIC (fast information channel) is a dedicated channel for carrying cross-layer information to enable fast service acquisition and channel scanning. FIC FLAG is a 1-bit field and indicates whether the FIC is used in a current frame. If this field is set to '1', the FIC is provided in the current frame. If this field set to '0', the FIC is not carried in the current frame. The BICM block 1010 may include BICM block for protection of the PLS data including a PLS FEC encoder, a bit interleaver and a constellation mapper.

The PLS FEC encoder may include a scrambler for scrambling PLS1 data and PLS2 data, a BCH encoding/zero insertion block for outer encoding on the scrambled PLS 1,2 data using a shortened BCH code for PLS protection, and insert zero bits after BCH encoding, an LDPC encoding block for LDPC encoding using an LDPC code and an LDPC parity puncturing block. The bit interleaver may interleave each of shortened and punctured PLS1 data and PLS2 data. The constellation mapper may map the bit-interleaved PLS1 data and PLS2 data to constellations.

The broadcast signal reception apparatus for future broadcast services according to the embodiment of the present invention may correspond to the broadcast signal transmission apparatus for future broadcast services described with reference to FIG. 8.

The broadcast signal reception apparatus for future broadcast services according to the embodiment of the present invention may include a synchronization & demodulation module carrying out demodulation corresponding to a reverse procedure of a procedure performed by the broadcast signal transmission apparatus, a frame parsing module parsing input signal frames and extracting data through which a service selected by a user is transmitted, a demapping & decoding module which convert input signals into bit domain data and then deinterleave the same as necessary, perform demapping of mapping applied for transmission efficiency and correct an error generated on a transmission channel through decoding, an output processor performing reverse procedures of various compression/signal processing procedures which are applied by the broadcast signal transmission apparatus and a signaling decoding module obtaining PLS information from a signal demodulated by the synchronization & demodulation module. The frame parsing module, the demapping & decoding module and the output processor may execute functions thereof using data output from the signaling decoding module.

According to an embodiment of the present invention, each TI group is either mapped directly to one frame or spread over Pi frames. Each TI group is also divided into more than one TI block ($N_{TI}$), where each TI block corresponds to one usage of a time interleaver memory. The TI blocks within the TI group may contain slightly different numbers of XFECBLOCKs. Typically, the time interleaver may also function as a buffer for DP data prior to a process of frame building.

The Time interleaving according to an embodiment of the present invention is a twisted row-column block interleaver. The twisted row-column block interleaver according to an embodiment of the present invention may column-wise write a first XFECBLOCK into a first column of a TI memory, and a second XFECBLOCK into a next column, and so on). Then, in an interleaving array, cells are diagonal-wise read diagonal-wise from a first row (rightwards along a row beginning with a left-most column) to a last row, Nr cells are read out. Moreover, in order to achieve single-memory deinterleaving at a receiver side regardless of a number of XFECBLOCKs in a TI block the twisted row-column block interleaver may insert the virtual XFEC-BLOCKs into the TI memory. The virtual XFECBLOCKs must be inserted in front of other FECBLOCKS to achieve single-memory deinterleaving at a receiver side.

FIG. 9 illustrates a write operation of a time interleaver according to an embodiment of the present invention.

A left block in the figure illustrates a TI memory address array, and right blocks in the figure illustrate a write operation when two virtual FEC blocks and one virtual FEC block are inserted into heads of two contiguous TI groups, respectively.

The frequency interleaver according to the present embodiment may include an interleaving address generator for generating an interleaving address for applying corresponding data to a symbol pair.

FIG. 10 illustrates an interleaving address generator including a main pseudo-random binary sequence (PRBS) generator and a sub-PRBS generator according to each FFT mode which are included in a frequency interleaver according to an embodiment of the present invention.

(a) shows the block diagrams of the interleaving-address generator for 8K FFT mode, (b) shows the block diagrams of the interleaving-address generator for 16K FFT mode and (c) shows the block diagrams of the interleaving-address generator for 32K FFT mode.

The interleaving process for the OFDM symbol pair is described as follows, exploiting a single interleaving-sequence. First, available data cells (the output cells from the Cell Mapper) to be interleaved in one OFDM symbol $O_{m,l}$ is defined as $O_{m,i}=[x_{m,l,0}, \ldots, x_{m,l,p}, \ldots, x_{m,l,Ndata-1}]$ for $l=0, \ldots, N_{sym}-1$, where $x_{m,l,p}$ is the $p^{th}$ cell of the $l^{th}$ OFDM symbol in the $m^{th}$ frame and $N_{data}$ is the number of data cells: $N_{data}=C_{FSS}$ for the frame signaling symbol(s), $N_{data}=C_{data}$ for the normal data, and $N_{data}=C_{FES}$ for the frame edge symbol. In addition, the interleaved data cells are defined as $P_{m,l}=[v_{m,l,0}, \ldots, v_{m,l,Ndata-1}]$ for $l=0, \ldots, N_{sym}-1$.

For the OFDM symbol pair, the interleaved OFDM symbol pair is given by $v_{m,l,Hi(p)}=x_{m,l,p}$, $p=0, \ldots, N_{data}-1$, for the first OFDM symbol of each pair $v_{m,l,p}=x_{m,l,Hi(p)}$, $p=0, \ldots, N_{data}-1$ for the second OFDM symbol of each pair, where $H_l(p)$ is the interleaving address generated based on a PRBS generator and a cyclic shift value (symbol offset) of a sub-PRBS generator.

Hereinafter, a signaling scheme for multiple RF services will be described. In other words, a scheme for instructing delivery of services (or broadcast services) provided on a plurality of RF channels will be described. First, (a) what the multiple RF services are and how the multiple RF services are signaled according to the presence or absence of channel bonding will be described, (b) SLT for the service will be described with reference to FIG. 11, and (c) S-TSID for describing components of the service will be described with reference to FIG. 12.

In the present specification, a broadcast stream as an abstraction of an RF channel may be defined as a carrier frequency centered within a specific bandwidth. The broadcast stream may be identified by a [geographic area and frequency] pair. A physical layer pipe (PLP) may correspond to a portion of the RF channel. Each PLP may have specific modulation and coding parameters.

Each service may be identified by two forms of service identifiers. First, a compact form may be used in the SLT and may be unique within the broadcast area. Second, a globally unique form may be used in SLS and ESG.

Each service (for example, ATSC 3.0 service) may have components in one or more RF channels. In other words, each service may include components delivered in one or more RF channels. As such, according to an embodiment, one service may comprise components delivered on a plurality of RF channels and such service may be referred to as multiple RF services.

In this case, a set of components of the service within a single RF channel may be referred to as a "portion" of the service. Specifically, when the set of components of such a service may be not constituted by all components of the service and the set of one or more components makes up the service, the set of the components of the service may be referred to as a "portion" of the service. In other words, when the service is constituted by a plurality of components, and the plurality of components are divided and included in one or more sets (a component set), such a set of components may be referred to as a "portion" of the service. That is, the "portion" of the service may be a component set including some of the components constituting the service. On the other hand, the set of the components of the service is constituted by all components of the service and when the set of one or more components is delivered, the set of the components of the service may be referred to as a "duplicate" of the service. In other words, when the service is constituted by the plurality of components, and all of the plurality of components is included in each set (component set), the component set may be referred to as the "duplicate" of the service. That is, the "duplicate" of the service may be a component set including all of the components constituting the service.

Such a service may include one or more portions sufficient for meaningful presentation of the service without using other portions (even though using other portions may also provide more appealing presentation). Such a portion may be referred to as an "essential" portion. For example, each service expressed by the portions may have one "essential" portion sufficient for providing the meaningful presentation without using another portion, that is, "non-essential" portions. That is, each service may include the essential portion which may provide the meaningful presentation of the service without using another portion. As such, the essential portion means a portion that may provide the meaningful presentation of the service without using another portion.

Each service portion may be included in the service list table (SLT) of the RF channel in which the portion is shown. All of multiple listings of the portion of the service need to have the same service ID value and the same major/minor channel number value. This may cause, when a receiver performs channel scan, a plurality of portions of the services in the plurality of RF channels to be consolidated to a channel map of the receiver by a single service. For example, when the channel scan is performed, the receiver may cause the plurality of portions delivered through the plurality of RF channels having the same service ID and the same major/minor channel number to be consolidated by the single service identified by the corresponding service ID in the channel map. Therefore, information on the single service delivered through the plurality of RF channels may be stored in the channel map.

An SLT entry/information for each portion of the service may also list a broadcast stream identifier (BSID) of the broadcast stream(s) for which other portions may be discovered. For example, the BSID of the broadcast stream(s) may be listed through other BSID element (OtherBsid) of the SLT information. This will be described below with reference to FIG. 11.

When the service includes one or more essential portions, the essential portions may be indicated in the SLT. For example, whether the essential portion of the corresponding service is included may be indicated through an essential attribute (@essential) of the SLT information. This will be described below with reference to FIG. 11.

When any essential portion is not also indicated in the SLT, the service does not have the essential portion. That is, in this case, the receiver may simply decide which component is to be presented from MPD. Service-based transport session instance description (S-TSID) for each portion for the service may describe LCT channels for each component within the portion. This will be described below with reference to FIG. 12.

Hereinafter, a scheme that signals, when the portion or duplicate of the service is delivered without with the channel bonding, the portion or duplicate through the SLT, the S-TSID, etc., will be described as an example.

As an embodiment, the portion or duplicate of the service may be delivered in a single RF channel without the channel bonding. Further, when the channel bonding is applied to an ATSC 3.0 link layer protocol (ALP) packet stream (or link layer packet stream), the portion or duplicate of the service may be delivered in a bonded RF channel.

First, when all service parts or duplicates are delivered without the channel bonding, SLT, S-TSID and MMT package table (MPT) messages may follow signaling rules as described below.

Each broadcast service, represented by either service parts or replicas, needs to be included in the SLTs of the RF channels in which the parts or duplicates appear. A plurality of respective listings represented by the portions or duplicates of the service needs to have the same service ID value and the same major/minor channel number value. This may cause, when the receiver performs the channel scan, a plurality of portions of the services carried in the plurality of RF channels to be consolidated to the channel map of the receivers by the single service. An SLT entry for the essential portion or any duplicate of such a service may also list the BSID of the broadcast stream where other portions or duplicates may be discovered.

For ROUTE/DASH, the S-TSID needs to be delivered in the PLP of each RF channel that delivers the service portion or duplicate. The S-TSID for each portion or duplicate of such a service may describe ROUTE sessions and LCT channels for each component of the service portion or duplicate.

For MMTP/MPU, the MPT message needs to be delivered in the PLP of each RF channel that delivers the essential portion or duplicate of the service.

Next, when the service portions are delivered with the channel bonding, that is, when the service portions are delivered on the bonded PLP(s) of two or more RF channels (i.e., bonded RF channels), the associated SLT, S-TSID, and MPT messages may follow the signaling rules as described below.

(1) When the essential portion of the service is delivered by the non-bonded PLP(s) of the RF channel:

SLTs associated with both non-bonded and bonded PLP(s) delivering any portions of the service may list the service. A plurality of respective listings represented by the portions needs to have the same service ID value and the same major/minor channel number value. Only the SLT entry for the essential portion of the service may list BSIDs of the broadcast streams where other portions may be discovered.

For ROUTE/DASH, the S-TSIDs may be delivered as follows: (a) In a single and non-bonded PLP that delivers one or more service portions through the non-bonded PLP(s) and (b) in the single and bonded PLP of the bonded RF channels delivering another service portion, the S-TSIDs may be delivered. In (a), each S-TSID instance needs to describe ROUTE sessions and LCT channels for each component of the service portion delivered by the corresponding non-bonded PLP(s) in the RF channel to which the PLP carrying the S-TSID belongs. In (b), each S-TSID instance needs to describe ROUTE sessions and LCT channels for each component of the service portion delivered by the corresponding non-bonded PLP(s) in the bonded RF channel to which the PLP carrying the S-TSID belongs.

For MMTP/MPU, the MPT message may be delivered in the single and non-bonded PLP of the RF channel that delivers the essential portion of the MPT message.

(2) When the essential portion of the service is delivered by the bonded PLP(s) of the bonded RF channels:

Only a single SLT associated with the bonded PLP(s) delivering the essential portion of the service may list the service. The SLT instance of such a service needs to list the BSIDs of the broadcast stream where another service portion may be discovered.

For ROUTE/DASH, only a single S-TSID for such a service may be delivered in the bonded PLP of the bonded RF channels delivering the essential portion of the service. The S-TSID instance needs to describe the ROUTE sessions and LCT channels for all components of the service.

For MMTP/MPU, the MPT message for the service may be delivered in the bonded PLP of the bonded RF channels delivering the essential portion of the service.

When the service duplicates are delivered with the channel bonding, that is, when the service duplicates are delivered on the bonded PLP(s) of the bonded RF channels, the SLT, S-TSID, and MPT messages may follow the signaling rules as described below.

SLTs associated with both non-bonded and bonded PLP(s) delivering the duplicates of the service may list the service. A plurality of respective listings of the service represented by the duplicates needs to have the same service ID value and the same major/minor channel number value. Only the SLT entry for the duplicate of the service may list BSIDs of the broadcast streams where other duplicates may be discovered.

For ROUTE/DASH, the S-TSIDs may be delivered as follows: (a) In the single and non-bonded PLP of each RF channel that delivers the service duplicate and (b) in the single and bonded PLP of the bonded RF channels delivering another service duplicate, the S-TSIDs may be delivered. In (a), each S-TSID instance needs to describe the ROUTE sessions and LCT channels for each component of the service duplicate delivered by the corresponding non-bonded PLP(s) in the RF channel to which the PLP carrying the S-TSID belongs. In (b), each S-TSID instance needs to describe the ROUTE sessions and LCT channels for each component of the service duplicate delivered by the corresponding bonded PLP(s) in the bonded RF channel to which the PLP carrying the S-TSID belongs.

For MMTP/MPU, the MPT message may be delivered as follows: (a) In the single and non-bonded PLP of each RF channel that delivers the service duplicate and (b) in the single and bonded PLP of the bonded RF channels delivering another service duplicate, the MPT message may be delivered.

FIG. 11 illustrates SLT information according to another embodiment of the present invention. In FIG. 11, a description duplicated with FIG. 3 will be omitted.

Referring to FIG. 11, the SLT information may include an @bsid attribute, an @sltCapabilities attribute, a sltInetUrl element, and/or a Service element. In addition, the Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broad bandAccessRequired attribute, an @svcCapabilities attribute, a BroadcastSvcSignaling element, and/or an svcInetUrl element. They are described above in FIG. 3, and as a result, a detailed description thereof will be omitted. Meanwhile, among them, the BSID attribute (@bsid) will be additionally described with reference to FIG. 13.

In comparison with the embodiment of FIG. 3, the SLT information of the embodiment of FIG. 11 may further include signaling information for multiple RF services. For example, the SLT information essential attributes (@essential) and/or other BSID elements (OtherBsid) for multiple RF services. As illustrated in FIG. 11, the essential attributes and other BSID elements may be sub-attributes and elements of the service element. That is, the essential attributes and other BSID elements may be included in the service element.

The essential attribute (@essential) may indicate whether the portion of the broadcast stream is the essential portion when the service has portions on the plurality of RF channels. In other words, the essential attribute may indicate whether the essential portion of the service is delivered through the broadcast stream when the service has one or more portions delivered through one or more RF channels. That is, the essential portion may be used for indicating whether the essential portion of the service is delivered through the broadcast stream.

As an example, the essential attribute should not exist when at least one other BSID element with a type attribute (@type) that is the "portion" does not exist for the service. In other words, there is no essential attribute when there is no other BSID element with a value of a type attribute indicating the "portion" in the corresponding service element.

When the essential attribute exists and is set to a first value (e.g., "true"), the essential attribute may indicate that the service identified by the service ID attribute (@service) has components on the plurality of RF channels and the portion in the broadcast stream is essential for the meaningful presentation of the service. In other words, when the essential attribute exists and is set to the first value, the first value of the essential attribute may indicate that the service identified by the service ID attribute has the components (or portions) delivered over the plurality of RF channels and the portion in the broadcast stream is the essential portion.

Alternatively, when the essential attribute exists and is set to a second value (e.g., "false"), the essential attribute may indicate that the service identified by the service ID attribute (@service) has components on the plurality of RF channels and the portion in the broadcast stream is not essential for the meaningful presentation of the service. A default for the essential attribute may not exist or may be the second value ("false"). In other words, when the essential attribute exists and is set to the second value, the second value of the essential attribute may indicate that the service identified by the service ID attribute has the components (or portions) delivered over the plurality of RF channels and the portion in the broadcast stream is the non-essential portion.

The other BSID element (OtherBsid) may indicate or provide an identifier of another broadcast stream including either the duplicate of the service or an additional portion of the service. In other words, the other BSID element may indicate or provide an identifier (ID) of another broadcast stream that delivers the duplicate or portion of the service. In this case, a format of each other BSID element may be the same as the format of the BSID attribute (@bsid). As an example, when the value of the value of the essential attribute is not set to the first value ("true"), the other BSID element may not exist. In other words, when the SLT information is not the SLT information for the essential portion, the SLT information may not contain other BSID elements.

As an example, the other BSID element may include the type attribute (@type) and/or the essential attribute (@essential). In this case, the essential attribute as an optional attribute may not be included in the other BSID element.

The type attribute (@type) of the other BSID element may indicate whether the broadcast stream identified by the other BSID attribute contains the duplicate or of the service or the other portion of the service. In other words, the type attribute may indicate whether the broadcast stream identified by the other BSID attribute delivers the duplicate or portion of the service.

As an example, the type attribute may indicate whether the broadcast stream identified by the other BSID attribute includes or delivers the duplicate or portion of the service according to the value of the type attribute. Table 1 below shows a code value for an exemplary type attribute.

TABLE 1

| type | Meaning |
| --- | --- |
| 0 | ATSC Reserved |
| 1 | Duplicate |
| 2 | Portion |
| 3-255 | ATSC Reserved |

Referring to Table 1, for example, when the value of the type attribute is set to a first value (e.g., 1 or "duplicate"), the type attribute may indicate that the broadcast stream identified by the other BSID element includes or delivers the "duplicate" of the service.

Alternatively, when the value of the type attribute is set to a second value (e.g., 2 or "portion"), the type attribute may indicate that the service element is the portion of the service having components in multiple broadcast streams and indicate that the broadcast stream identified by the other BSID element is another portion including an additional component of the service. For example, when the value of the type attribute is set to the second value, the type attribute may indicate the portion of the service in which the service element is the portion of the service having the components in the broadcast stream identified by the other BSID element and indicate that the service identifier is given by a value of a service ID attribute of a parent service element.

As an example, when one or more other BSID elements exist under the parent service element, the type attribute values of the other BSID elements need to be the same.

The essential attribute (@essential) of the other BSID element may indicate that when the type attribute is the second value (e.g., 2 or "portion"), the portion included in the broadcast stream identified by the other BSID element is essential for the meaningful presentation of the service. In other words, the essential attribute of the other BSID element may indicate that when the type attribute is the second value, the portion included in the broadcast stream identified by the other BSID element is the essential portion. For example, when the value of the essential attribute is the first value (e.g., "true"), the value may indicate that the portion is the essential portion and when the value of the essential attribute is the first value (e.g., "false"), the value may indicate that the portion is the non-essential portion.

As such, when the components constituting the service are divided and delivered to two or more RF channels, preferably all the components necessary for the meaningful presentation of the service are to be delivered on one RF channel and secondary RF channels are to be used only for delivering supplemental components.

FIG. 12 illustrates S-TSID information according to an embodiment of the present invention. In FIG. 12, a description duplicated with contents described above in FIG. 4 will be omitted.

As described above, the S-TSID is an SLS metadata fragment that contains overall transport session description information for zero or more ROUTE sessions and the constituent LCT channels over which media content components of the broadcast service are delivered. The S-TSID may also include file metadata for delivery objects or object flows carried in the LCT channels of the service and additional information regarding the content components and payload formats carried in the LCT channels. For a service with components in two or more broadcast streams, the S-TSID may describe only ROUTE sessions and LCT channels within the broadcast stream in which the S-TSID appears.

The ROUTE session may be identified by a source IP address, a destination IP address, and a destination port number. The LCT channel associated with the carried service component(s) may be identified by a unique Transport Session Identifier (TSI) within a parent ROUTE session.

In a particular case of LCT channels that are strictly allocated for delivery of application-related files, TSI values of the LCT channels should be unique in all ROUTE sessions in which the application-related files are transported as described by an HELD metadata fragment defined in an ATSC 3.0 application signaling standard and associated with the ATSC 3.0 service, for example. The LCT channel should not be used to carry both the application files associated with the service and media components of a linear service.

Characteristics common to the LCT channels and specific characteristics unique to individual LCT channels are given to a ROUTE signaling structure called S-TSID which is a part of service layer signaling. Each LCT channel may be carried through a single PLP. Each PLP may include one or more LCT channels. Different LCT channels of the ROUTE session may be included or not included in different PLPs. The characteristics described in the S-TSID may include a TSI value for each LCT channel, descriptors for the delivery objects/files, and application layer FEC parameters. Hereinafter, the S-TSID information will be described in detail with reference to FIG. 12.

In the embodiment of FIG. 12, the S-TSID information as an S-TSID carried in ROUTE may have an S-TSID root element. The S-TSID element may include a service ID attribute (@ serviceId) and/or an RS element. Respective fields may be omitted according to a value of an illustrated Use column or there may be multiple fields.

The service ID attribute (@serviceId) as an identifier of the corresponding service may refer to a corresponding service element of a USBD fragment. The service ID attribute may identify the corresponding service of the USBD fragment that appears on the same LCT channel as the S-TSID information. The value of the service ID attribute has the same as the value of the service ID attribute in USBD.

The RS element may describe information regarding ROUTE sessions over which the service components of the service are delivered. Depending on the number of ROUTE sessions, a plurality of corresponding elements may exist. As an example, the RS element may include an @bsid attribute, an @slpAddr attribute, an @dlpAddr attribute, an @dport attribute, and/or an LS element. They are described above in FIG. 4, and as a result, a detailed description thereof will be omitted.

Unlike the embodiment of FIG. 4, in the embodiment of FIG. 12, the RS element may not include the PLP ID attribute (@PLPID). In this case, the PLP ID information of the ROUTE session may be obtained by combining the information in the LMT described above in FIG. 7 with the IP address/UDP port information of the RS element.

Also, as in the embodiment of FIG. 4, the RS element may further include THE BSID attribute (@bsid). In this case, this BSID attribute may be used to identify the broadcast stream over which the service components of the service are delivered.

The LS element may describe information regarding the LCT channels in which the service components of the service are delivered. Depending on the number of LCT sessions, a plurality of corresponding elements may exist. As an example, the LS element may include an @tsi attribute, an @bw attribute, an @startTime attribute, an @endTime attribute, a SrcFlow element, and/or a RepairFlow element. They are described above in FIG. 4, and as a result, a detailed description thereof will be omitted. Unlike the embodiment of FIG. 4, in the embodiment of FIG. 12, the LS element may not include the PLP ID attribute (@PLPID).

Hereinafter, a method for providing multiple RF services by using the channel bonding will be described.

First, channel bonding of a physical level will be described. At the physical level, the RF channel may be bonded to one other RF channel, which is called channel bonding. In this case, some or all of the PLPs in the RF channel may be bonded in pairs. This type of channel bonding may include plain channel bonding in which a packet stream is split between PLPs bonded or SNR channel bonding in which the bonded PLPs carry the same packet stream.

Further, partitioning of an application level will be described. The partitioning is used for sharing the broadcast stream among service providers. As an example, the PLPs of the RF channel may be partitioned into disjoint sets. That is, the PLPs of the RF channel may be partitioned into two or more sets/partitions constituting the disjoint set. In this case, the services may span the partitions. Further, each partition may have an LLS channel thereof having an SLT thereof. Hereinafter, examples of the channel bonding and partitioning will be described with reference to FIG. 13.

FIG. 13 illustrates one example of channel bonding and partitioning according to an embodiment of the present invention.

As described above, the PLPs of one RF channel may be partitioned into two or more partitions. For example, as illustrated in FIG. 13, PLPs (PLP #1 to #4) of one channel (RF channel A) may be partitioned into two partitions (partition a and partition b) and PLPs ((PLP #4 to #6) of the other channel (RF channel B) may also be partitioned into two partitions (partition x and partition y).

Further, one RF channel may be bonded to the other RF channel. For example, as illustrated in FIG. 13, some PLP (PLP #4) of one RF channel (RF channel A) and some PLP (PLP #4) of the other RF channel (RF channel B) may be bonded to each other.

Hereinafter, each of a use example (first use example) in the PLP to which the SLT information is bonded and a use example (second use example) in which the SLT information exists in the non-bonded PLP will be described.

First, the first use example in which the SLT information is included in the bonded PLP is described. In the embodiment of FIG. 13, an arbitrary service component (or content component) of PLP #4 may be shown as an "ordinary" component shown in partition b and "other" component shown in partition x. In addition, the service may be indicated or signaled to have the portion of the service or the duplicate of the service in the "other" RF channel (RF channel B). However, the same SLT information included in the bonded PLP may appear in both partitions. Therefore, there may be no service component in PLP #3. Similarly, there may be no service component in PLP #5. Therefore, PLPs #3 and #5 do not exist. That is, all the PLPs in the partitions b and x may be bonded and the SLT information may signal services in the bonded partitions. In other words, when the SLT information may exist in the bonded PLP, the SLT information may signal the service having the components in the bonded PLP.

Next, the second use example in which the SLT information is included in the non-bonded PLP will described. SLT information (SLT-b) in PLP #3 may signal a service and service portions in partition b of RF channel A (including PLP #3 and PLP #4). In this case, the service having the components in PLP #4 may be bonded to RF channel B. Further, the service may include components (portions or duplicates of the service) in "other" RF channels other than RF channel A.

Alternatively, SLT information (SLT-x) in PLP #5 may signal a service and service portions in partition x of RF channel B (including PLP #4 and PLP #5). In this case, the service having the components in PLP #4 may be bonded to RF channel A. Further, the service may include components (portions or duplicates of the service) in "other" RF channels other than RF channel A.

In the PLP pair bonded as the PLP in each RF stream, the BSID attribute (@bsid) of the SLT information should be able to have a plurality of values. The SLT information in the bonded PLP needs to be labeled with the BSID attributes of all RF channels included in the channel bonding. That is, the SLT information in the bonded PLP needs to have values of the BSID attributes of all RF channels included in the channel bonding. Therefore, when performing a channel scan, the broadcast receiver may acquire the SLT information from each broadcast stream included in the channel bonding and store information on the same service indicated by the SLT information in the channel map together.

To this end, the BSID attribute of the SLT information should be able to identify one or more broadcast streams including the service. Accordingly, the BSID attribute should be a list including one or more BSIDs. In this case, each BSID may identify the broadcast stream.

In this case, the BSID attribute may include a plurality of BSIDs according to an embodiment. For example, when the service is delivered through the channel bonding in a physical layer, the list should include a BSID value of each RF emission (or RF channel or broadcast stream) included in the bonding. In other words, when the service is delivered through the channel bonding in the physical layer, the BSID attribute of the SLT information should include each RF channel (or broadcast stream) included in the channel bonding. In this case, each BSID value should be equal to a value indicated by L1D_bsid parameter/information of L1-detail information in the physical layer.

As described above, a physical layer frame (physical frame) may include a preamble and the preamble may include at least one L1 signaling information, for example, L1-basic information and/or L1-detail information. As an example, the L1-detail information may include L1D_bsid parameter/information, L1_bonded_bsid parameter/information, and/or L1D_rf_id parameter/information.

Here, the L1D_bsid information may indicate the BSID of the corresponding RF channel. A value of the L1D_bsid information should be unique at a local level (e.g., North America). The L1_bonded_bsid information may indicate the BSID of a separate RF channel which is a channel bonded to the corresponding RF channel and is associated with an implicit ID of the L1D_rf_id parameter/information. The L1D_rf_id information as a field which is implicitly defined may specify IDs of the other RF channel included in the channel bonding.

In addition, a service or service portion having predetermined components included in the bonded PLP may be signaled with the other BSID element indicating other RF channel(s). In this case, the type attribute of the other BSID element may be set to a third value (e.g., 3 or "bonded"). Table 2 below shows a code value for the type attribute of the other BSID element. Unlike Table 1, in an example of Table 2, the type attribute of the other BSID element may further include the third value indicating "bonded".

TABLE 2

| type | Meaning |
|---|---|
| 0 | Undefined |
| 1 | DUPLICATE |
| 2 | PORTION |
| 3 | BONDED |
| other values | Reserved for future use |

FIG. 14 is a diagram illustrating a method for delivering a service through channel bonding according to an embodiment of the present invention.

In the embodiment of FIG. 14, it is assumed that that there are two RF channels (RF channel 1 and RF channel 2).

Further, it is assumed that there is one normal stream with LLS information in each of the two RF channels (In this case, each RF channel includes one service A or B and service 4.1 (service A) has an extract audio carried in a plain channel bonding (PCB) stream. In other words, the essential portion of service A may be delivered through the non-bonded PLP and the non-essential portion may be delivered through the bonded PLP).

Further, it is assumed that there is one PCB stream having the LLS information (In this case, the PCB stream includes one normal service and includes one service having the extra audio).

In this case, the SLT information which exists in non-bonded PLP (PLP #1) in a first RF channel (RF channel 1) may include the BSID attribute and the service element. In this case, the BSID attribute of the SLT information may be set to an "A" value for identifying the broadcast stream delivered through RF channel 1. Further, the service element of the SLT information may include a service ID attribute set to "6" for identifying a first service, a major/minor channel number attribute set to "4.1", and the other BSID attribute set to "A". In this case, the BSID may include the type attribute set to the value indicating "bonded" and an essential attribute set to a value indicating that a portion included in the broadcast stream ("A") indicated by the other BSID attribute is not the essential portion.

Further, the SLT information which exists in non-bonded PLP (PLP #2) in a second RF channel (RF channel 2) may include the BSID attribute and the service element. In this case, the BSID attribute of the SLT information may be set to a "B" value for identifying the broadcast stream delivered through RF channel 2. Further, the service element of the SLT information may include a service ID attribute set to "8" for identifying a second service and a major/minor channel number attribute set to "4.3".

Further, the SLT information which exists in bonded PLP (PLP #3) may include the BSID attribute and the plurality of service elements. In this case, the BSID attribute of the SLT information may be set to a list ("A, B") including an "A" value for identifying the broadcast stream delivered through RF channel 2 and a "B" value for identifying the broadcast stream delivered through RF channel 2. Further, a first service element of the SLT information may include a service ID attribute set to "8" for identifying a third service and a major/minor channel number attribute set to "4.2". In addition, a second service element of the SLT information may include the service ID attribute set to "1" for identifying the first service, the major/minor channel number attribute set to "4.1", and the other BSID attribute set to "A". In this case, the BSID may include the type attribute set to the value indicating "bonded" and an essential attribute set to a value indicating that the portion included in the broadcast stream ("A") indicated by the other BSID attribute is the essential portion.

In summary, as in the embodiment of FIG. 13, in the case of delivering the service through the channel bonding, the BSID attribute of the SLT information included in the bonded PLP should include the BSID value ("A, B") of each RF channel (or the broadcast stream of each RF channel included in the channel bonding.

Further, when the service is delivered through the channel bonding, in a case where the essential portion of the service is included in the non-bonded PLP and the non-essential portion of the service is included in the bonded PLP), the SLT information included in the bonded PLP should have SID information of the SLT information included in the non-bonded PLP and SID information and major/minor channel information having the same value as the major/minor channel information. Further, the service element of the SLT information included in the bonded PLP may include an essential attribute indicating whether the essential portion of the service is delivered in the corresponding broadcast stream.

Hereinafter, a scheme that transmits an alternative service of the corresponding service among multiple RF services through the other broadcast stream will be described. Hereinafter, it is assumed that complete services are provided on a given RF channel and each RF channel is tuned by a single tuner. In this case, in order to transmit the alternative service of the corresponding service through the other broadcast stream, the SLT information may include an alternative BSID attribute (@alternativeBsid) and/or an alternative service ID attribute (@alternativeServiceId). This will be described below with reference to FIG. 15.

FIG. 15 illustrates SLT information according to yet another embodiment of the present invention. In FIG. 15, a description duplicated with the contents described above in FIGS. 3 and 11 will be omitted.

Referring to FIG. 15, the SLT information may include an @sbid attribute, an @sltCapabilities attribute, a sltInetUrl element, and/or a Service element. In addition, the Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broad bandAccessRequired attribute, an @svcCapabilities attribute, a BroadcastSvcSignaling element, and/or an svcInetUrl element. They are described above in FIGS. 3 and 11, and as a result, a detailed description thereof will be omitted.

In comparison with FIGS. 3 and 11, the SLT information of the embodiment of FIG. 11 may include information for transmitting the service through multiple RF channels. For example, the SLT information may include an alternative BSID attribute (@alternativeBsid) for the alternative service of the corresponding service transmitted through an RF channel different from the RF channel of the corresponding service and an alternative service ID attribute (@alternativeServiceId). Each attribute will be described below.

The alternative BSID attribute (@alternativeBsid) may indicate an ID of the broadcast stream of the RF channel through which the alternative service of the corresponding service is transmitted. The alternative BSID attribute may be used to identify the broadcast stream over which the alternative service of the corresponding service is transmitted. When the alternative service of the corresponding service is transmitted through the same RF channel (or broadcast stream), the alternative BSID attribute may be omitted. That is, in a case where the alternative BSID attribute exists, the case indicates that the alternative service of the corresponding service is transmitted through the other broadcast stream.

The alternative BSID attribute (@alternativeBsid) may indicate the ID of the alternative service of the corresponding service. The alternative service ID attribute may be used to identify the alternative service of the corresponding service. As an example, the alternative BSID attribute and the alternative service ID attribute should exist in pairs.

As illustrated in FIG. 15, the alternative BSID attribute and the alternative service ID attribute may be sub-attributes of the service element (Service) of the SLT information. That is, the alternative BSID attribute and the alternative service ID attribute may be included in the service element (Service) of the SLT information. In this case, the alternative BSID attribute may identify the broadcast stream over which the alternative service of the service identified by the service ID attribute (@serviceId) of the corresponding service element is transmitted. Further, the alternative service ID attribute may identify the alternative service. As an example, the value of the alternative service ID attribute may be equal to the value of the service ID attribute of the service element.

The above-mentioned alternative service replaces the corresponding service and may be, for example, a service that replaces contents provided through the corresponding service with different contents and provides the contents. However, the alternative service is not limited thereto and the alternative service may be a service for replacing the same contents as the corresponding service with a transmission scheme different from a transmission scheme (or protocol) of the corresponding service and transmitting the contents. For example, when the corresponding service is an ATSC 3.0 broadcast service, the alternative service may be an ATSC 1.0 broadcast service that carries the same contents as the corresponding service through an ATSC 1.0 broadcast stream.

In this case, the alternative BSID attribute may be used to identify the broadcast stream of the alternative service that carries contents which are the same as the contents of the corresponding service. For example, the alternative BSID attribute may be used to identify the ATSC 1.0 broadcast stream which is the broadcast stream of the ATSC 1.0 service which is the alternative service that carries contents which are the same as the contents of the ATSC 3.0 service which is the corresponding service. Therefore, it may be indicated that the alternative service of the corresponding service is transmitted through a different broadcast stream from the corresponding service. In this case, the alternative BSID attribute may be referred to as a simulcast ID attribute or a simulcast TSID attribute.

Hereinafter, a description will be given of a scheme of signaling a dynamic event in the SLT when the dynamic event is delivered via broadband (for example, HTTP or Web socket) with respect to app signaling.

FIG. 16 illustrates a code value for a URL type attribute of an SLT URL element of SLT information according to an embodiment of the present invention.

As described above in FIGS. 3, 11, and 15, the SLT information may include an SLT URL element (sltInetUrl). The SLT URL element may indicate a base URL for acquiring files (e.g., ESG or SLS files) for all services included in the SLT information through the broadband.

The SLT URL element may include a URL type attribute (@urlType). The URL type attribute may indicate the types of files available with the SLT URL element. That is, the URL type attribute may indicate the type of file that may be obtained using the URL indicated by the SLT URL element.

Referring to FIG. 16, when the value of the URL type attribute is a first value (e.g., 1), the URL type attribute may indicate that the URL indicated by the SLT URL element is the URL of an SLS server providing access to an SLS file, that is, the URL of the SLS server for acquiring the SLS file. Alternatively, when the value of the URL type attribute is a second value (e.g., 2), the URL type attribute may indicate that the URL indicated by the SLT URL element is the URL of an ESG server providing access to ESG data, that is, the URL of the ESG server for acquiring the ESG data. Alternatively, when the value of the URL type attribute is a third value (e.g., 3), the URL type attribute may indicate that the URL indicated by the SLT URL element is the URL of a service use data collection report server, that is, the URL of the ESG server used for reporting a service use. Alternatively, when the value of the URL type attribute is a fourth value (e.g., 4), the URL type attribute may indicate that the URL indicated by the SLT URL element is the URL of a dynamic event web socket server providing access to the dynamic event through a web socket protocol.

Hereinafter, a scheme of providing preview-related information in a service guide according to an embodiment of the present invention will be described. In the present specification, the service guide may be referred to as an electronic service guide, a program guide, or an electronic program guide (ESG).

In the present specification, the service guide means a function for presenting a service announcement and the service announcement means information regarding a broadcast service and available contents. In the present specification, the service announcement function (or service guide) enables a provider of the broadcast service to describe an available service. Further, the service announcement function (or service guide) enables a method for describing how to access the service.

From a viewpoint of a user, the service announcement function (or service guide) enables the user to use an on-screen service guide that may be viewed as an entry point for discovering the broadcast service and selecting the service. That is, the user may select discover the broadcast service and select the service through the service guide provided through the broadcast receiver. Such a service announcement may provide a description of provision of contents. Further, the service announcement may provide filtering performance based on user preference and content characteristics such as captioning, interactive enhancement, video formats (3D, SD, HD, and UD), audio formats (stereo, 5.1 channel, etc.), a content viewing rating, an accessible audio track, an alternative language, etc. Further, in the case of a scheduled service, the service announcement may also provide information regarding a date and a time scheduled so as to broadcast each providing.

The service guide may be configured by a data model that models the service, the schedule, and the contents from the viewpoint of the service guide fragment. In this case, information on the service guide may include a service fragment, a content fragment, and/or a schedule fragment. That is, the service guide information may have a structure including the service fragment, the content fragment, and/or the schedule fragment. In other words, a service guide structure may be constituted by the service fragment, the content fragment, and/or the schedule fragment. Here, the service fragment may be a part of the service announcement describing the broadcast service, the content fragment may be a part of the service announcement describing a program or a content item, and a schedule fragment may be a part of the service announcement describing a presentation schedule of the content within the broadcast service.

The broadcast system according to an embodiment of the present invention may provide an advance service guide providing preview-related information so as to overcome a limit of providing a simple service guide based on an existing text and so as for a viewer to receive more various information through the service guide. To this end, the broadcast system may insert additional data (e.g., thumbnails, video links, data for promotional sites, etc.) including previews, that is, the preview-related information into the service guide.

In the case of providing the service guide including the preview-related information in the broadcast system, the broadcast system may provide a representative image (e.g., a thumbnail image) for each program according to time information in the service guide and the viewer may thus receive additional information such as an image, etc. as well as a text for program information depending on a time of the corresponding service. Further, the broadcast system may provide a moving picture link to the program in the service guide, so that the viewer may directly access a desired moving picture. As such, through the preview-related information provided in the service guide, the viewer may enter not only contents (for example, a program) according to a time specified in the service guide but also the moving image and the additional information through the broadcast receiver. Hereinafter, referring to FIGS. 17 to 20, various embodiments for the broadcast system to provide the preview-related information in the service guide will be described.

FIG. 17 illustrates a service fragment of a service guide according to an embodiment of the present invention. FIG. 18 illustrates a service-level private extension element of a service fragment according to an embodiment of the present invention.

In the embodiments of FIGS. 17 and 18, the preview-related information may be provided through an icon element of the service fragment of the service guide information. In this case, the icon element may be provided through extension of a private extension (PrivateExt) element of the service fragment.

Specifically, referring to FIG. 17, the service fragment may include the private extension (PrivateExt) element. The private extension element of the service fragment may be referred to as a service-level private extension (ATSC3ServiceExtention) element. Here, the service-level private extension element may include additional information for the broadcast service (e.g., ATSC 3.0 service). As an example, the service-level private extension element may include the icon element, a major channel number element, and/or a minor channel number element.

Referring to FIG. 18, the icon element may indicate a URL pointing an icon used for expressing the service in the service guide information. As an example, multiple URLs may be used for pointing icons of different widths and height or different representation formats. As an example, the icon element may include a MIME type attribute (MIMEType), a width attribute (width), a height attribute (height), and/or a size attribute (size).

The MIME type attribute (MIMEType) may indicate the MIME type of the icon. This allows the receiver to ignore image types that may not be presented.

The width attribute (width) may indicate the width of a referenced image in pixels. The height attribute (height) may indicate the height of the referenced image in pixels. The size attribute (size) may indicate the size of image data in bytes. In the present specification, the size attribute may be referred to as a data size attribute (dataSize).

Through such an icon element, the broadcast receiver may show an icon representative of each service in the service guide. This may provide a richer service guide interface to the user. Further, the broadcast system according to an embodiment of the present invention allows the broadcast receiver to first determine whether the broadcast receiver may provide icon information to the user according to the MIME type attribute value of the icon element.

FIG. 19 illustrates a content fragment of a service guide according to an embodiment of the present invention. FIG. 20 illustrates a content-level private extension element of a content fragment according to an embodiment of the present invention.

In the embodiments of FIGS. 19 and 20, the preview-related information may be provided through a content icon element and/or a preview element of the content fragment of the service guide information. In this case, the content icon element (ContentIcon) and the preview element (Preview) may be provided through extension of the private extension (PrivateExt) element of the content fragment.

Specifically, referring to FIG. 19, the content fragment may include the private extension (PrivateExt) element. The private extension element of the content fragment may be referred to as a content-level private extension (ATSC3ServiceExtention) element. As an example, the content-level private extension element may include a component element, a content icon element (ContenIcon), and/or a preview element (Preview).

Referring to FIG. 19, the content icon element (ContenIcon) may indicate a URL pointing an icon used for expressing the content element in the service guide information. As an example, multiple URLs may be used for pointing icons of different widths and height or different representation formats. As an example, the content icon element may include the MIME type attribute (MIMEType), the width attribute (width), the height attribute (height), and/or the size attribute (size).

The MIME type attribute (MIMEType) may indicate the MIME type of the icon. This allows the receiver to ignore image types that may not be presented.

The width attribute (width) may indicate the width of the referenced image in pixels. The height attribute (height) may indicate the height of the referenced image in pixels. The size attribute (size) may indicate the size of image data in bytes. In the present specification, the size attribute may be referred to as the data size attribute (dataSize).

Through such a content icon element, the broadcast receiver may show an icon representative of each content in the service guide. This may provide the richer service guide interface to the user. Further, the broadcast system according to an embodiment of the present invention allows the broadcast receiver to first determine whether the broadcast receiver may provide content icon information to the user according to the MIME type attribute value of the icon element.

Further, referring to FIG. 19, the preview element (Preview) may provide a method for referring to a promotional content for a specific ESG content element/fragment. Examples may include a movie trailer, a news promotional article, a banner image, and the like. Multiple preview items may be included in extension of the content element and each item may provide various types of promotional data as described in a description element. As an example, the preview element may include a preview icon element (PreviewIcon), a description element (Description), and/or a preview data element (PreviewData). Further, the preview element as an optional attribute may further include a usage attribute (usage).

The usage attribute (usage) may describe how the preview item is intended to be used in the service guide. The value of the usage attribute may include "promo" which is a default value indicating that the preview is promotional and may be video contents, "preface" which is instructed to display a preview medium to be displayed during a channel change of a specific content element, and/or "banner" indicating that the preview element represents a banner advertisement and may be displayed in an appropriate area.

The preview icon element (PreviewIcon) may indicate a URL pointing an icon used for expressing the preview element in the service guide information. As an example, multiple URIs may be used for pointing icons of different widths and height or different representation formats. As an example, the preview element may include the MIME type attribute (MIMEType), the width attribute (width), the height attribute (height), and/or the size attribute (size).

The MIME type attribute (MIMEType) may indicate the MIME type of the icon. This allows the receiver to ignore image types that may not be presented.

The width attribute (width) may indicate the width of the referenced image in pixels. The height attribute (height) may indicate the height of the referenced image in pixels. The size attribute (size) may indicate the size of image data in bytes. In the present specification, the size attribute may be referred to as the data size attribute (dataSize).

The description element may provide a description of the preview element. The description element may include a sub element indicating the description and phonetic information on the description. As an example, the description element may include a text attribute (text), a language attribute (Xml: lang), a speech information URI element (SpeechInfoURl), and/or a speech info element (SpeechInfo).

The text attribute (text) may provide the description of the preview element. The language attribute (Xml: lang) may indicate a language of the text attribute expressed as the language attribute of which is an XML attribute.

The speech information URI object/element (SpeechInfoURl) may indicate a URI address at which the speech info element for a parent description element is obtained. As an example, the speech info URI element may include a content type attribute (content-type) and/or a content encoding attribute (content-enc). The content type attribute (content-type) may indicate a content type of a speech information object referenced by the speech information URI element. The content encoding attribute (content-enc) may indicate content encoding of the speech information object referenced by the speech information URI element.

The speech information URI object/element (SpeechInfo) may indicate embedded speech information for the parent description element. As an example, the speech info element may include the content type attribute (content-type) and/or the content encoding attribute (content-enc). The content type attribute (content-type) may indicate the content type of the speech information object. The content encoding attribute (content-enc) may indicate the content encoding of the speech information object.

The preview data element (PreviewData) may indicate a URI pointing a content that may be displayed as preview data for the content element in the service guide information. As an example, multiple URIs may be used for pointing icons of different widths and height or different representation formats.

The preview data element is also capable of referencing other types of data other than multimedia, but here, the referenced URI may refer to a similar semantic context having different representations like images having different encoding formats (e.g., png, jpg, or gif). As an example, the preview data element may include the MIME type attribute (MIMEType), the width attribute (width), the height attribute (height), and/or the size attribute (size).

The MIME type attribute (MIMEType) may indicate the MIME type of the icon. This allows the receiver to ignore image types that may not be presented.

The width attribute (width) may indicate the width of the referenced image in pixels. The height attribute (height) may indicate the height of the referenced image in pixels. The size attribute (size) may indicate the size of image data in bytes. In the present specification, the size attribute may be referred to as the data size attribute (dataSize).

The content icon element, preview icon element, and/or preview data element described above may be optional. The elements may be provided as information that allows a receiver ESG system to avoid accessing an image and preview data which may not be processed by the receiver ESG system. Hereinafter, usage of the preview will be described.

The preview element allows one or more previews to be associated with the content item. For ESG implementation that supports the promotional previews, when the content element is selected in the ESG, the access to the previews may be provided in any scheme. When the preview description and the icon, the preview description and icon allow the users to decide whether the users are interested in accessing the preview.

The usage attribute of each preview may provide information regarding how the ESG system is intended to use the preview data. The "promo" which is the default value may indicate the preview includes audio and video contents for promoting the content item. Examples of this type of preview may include movie trailers, news promotions, and other familiar promotional material types.

The "preface" usage attribute indicates that the referenced preview data may be displayed during the service change. In this case, when the user generally selects a specific content for viewing, if the selection takes longer than a receiver-defined time limit, the "preface" usage attribute may be an image slate or a single frame which may be displayed.

The "banner" usage attribute may indicate that the preview medium is generated in an optimal aspect ratio for the banner advertisement. In this case, the banner may be just displayed when the user selects a content on the ESG. It should be noted that banners and various other preview items may be provided for the same content item in the ESG.

FIG. 21 illustrates a method for providing a preview on an electronic service guide (ESG) by a broadcast receiver according to an embodiment of the present invention.

First, the broadcast receiver may acquire data (service guide data) for the ESG through the broadband or broadcast. For example, the broadcast receiver may acquire service guide data from a broadcast signal received via a broadcast network.

As illustrated in FIG. 21(a), the service guide data may include a content fragment/information and the content information may include a preview element/information. In addition, the preview information may include the preview icon element/information, description element/information, and/or preview data element/information described above.

Thereafter, the broadcast receiver may provide a preview image and a description on a service guide screen using the preview icon information and description information in the content information of the service guide data. For example, as illustrated in FIG. 21(b), the broadcast receiver may provide the preview icon and the description (e.g., "Preview of Edition 18 of You Over Starts") of the preview on the service guide. In this case, the broadcast receiver may acquire the preview icon image from the server by using the URL of the preview icon information.

Thereafter, the broadcast receiver may provide the preview by using the preview data information in the content information of the service guide data. For example, as illustrated in FIG. 21(c), the broadcast receiver may provide the preview (e.g., "Preview Video of Edition 18 of You Over Starts") on the screen. In this case, the broadcast receiver may acquire the preview data (e.g., video data) from the server by using the URL of the preview data information.

FIG. 22 illustrates a configuration of a broadcast signal transmitter/receiver according to an embodiment of the present invention. In the present specification, a broadcast signal transmitter may be referred to as a broadcast transmitter, a transmitter, etc., and a broadcast signal receiver may be referred to as a broadcast receiver, a receiver, etc.

Referring to FIG. 22, a broadcast signal receiver/transmitter 2200 may include a communication unit 2210, a processor 2220, and a memory 2230.

The communication unit 2210 is connected with the processor 2220 to transmit/receive a broadcast signal. The communication unit 2210 may transmit a signal by up-converting data received from the processor 2220 to a transmission/reception band. The communication unit 2210 may down-convert the received data and deliver the down-converted data to the processor 2220.

The processor 2220 is connected with the communication unit 2210 to implement a broadcast signal processing technology according to an ATSC 3.0 system. The processor 2220 may be configured to perform operations in accordance with various embodiments of the present invention in accordance with the aforementioned drawings and descriptions. Further, at least one of a module that implements the operation of the broadcast signal transmitter/receiver 2200 according to various embodiments of the present invention may be stored in the memory 2230 and executed by the processor 2220.

The memory 2230 is connected with the processor 2220 to store various pieces of information for driving the processor 2220. The memory 2230 is included in the processor 2220 or installed outside the processor 2220 to be connected with the processor 2220 by a known means. A detailed configuration of the broadcast signal transmitter/receiver 2200 may be implemented such that matters described in various embodiments of the present invention described above are applied independently or two or more embodiments are simultaneously applied.

FIG. 23 illustrates a broadcast signal transmitting method according to an embodiment of the present invention.

The broadcast transmitter may generate low level signaling (LLS) information (S23010). LLS information as a signaling transmitted at an IP level is described in FIG. 3. The LLS information may also be referred to as an LLS table.

The LLS information may include LLS ID information that identifies a type of LLS information. In this case, the LLS information may include service list table (SLT) information according to type ID information. For example, when the type ID information has a first value (e.g., 0x01), the LLS information may include the SLT information. The SLT information as a table/information providing information regarding a service is described in FIGS. 3, 11, etc.

As an example, the SLT information may include service information for the broadcast service and BSID information providing one or more broadcast stream IDs.

As an example, when the broadcast service is delivered through channel bonding, the BSID information may include broadcast stream IDs of each RF channel included in the channel bonding. This is described in FIGS. 11, 13, and 14.

As an example, the service information may further include other BSID information indicating an ID of another broadcast stream including any one of a portion of the broadcast service and a duplicate of the broadcast service. Further, the other BSID information may include type information indicating that another broadcast stream identified by the other BSID information includes the portion or the duplicate of the broadcast service. In addition, when the broadcast service has portions delivered in a plurality of RF channels, the service information may further include essential information indicating whether a portion included in the broadcast stream identified by the BSID is an essential portion of the broadcast service. Here, the portion may be a component set including some of a plurality of components constituting the broadcast service and the duplicate may be a component set including all of the plurality of components constituting the broadcast service. This is described in FIG. 11.

As an example, the service list information may include URL information providing a basic URL for acquiring a file for the broadcast service through a broadband and the SLT URL information may include URL type information indicating a type of file available as the basic URL. In this case, the URL type information may indicate that the basic URL is a URL of a service layer signaling server, a URL of an ESG server, a URL of a service use data collection report server, or a URL of a dynamic event web socket server according to a value of the URL type information. This is described in FIG. 16.

As an example, when the broadcast service is an electronic program guide (ESG) service, service data for the ESG service may include content information for contents of the broadcast service. The content fragment may include preview information and the preview information may include preview icon information providing a URL pointing an icon image used for representing the preview information, description information providing a description of the preview information, and preview data information providing a URI pointing contents to be displayed as preview data for the content information. This is described in FIGS. 17 to 21.

The broadcast signal transmitter may process the LLS information into IP packets (S23020). In this case, in processing the LLS information into IP packets, the LLS information may be processed into IP packets having a well-known IP address. For example, the LLS information may be processed into IP packets with an address of 224.0.23.60. This is described above with reference to FIG. 3.

The broadcast signal transmitter performs link layer processing of the IP packets to generate link layer packets (S23030). According to an embodiment, the IP packets including the SLT information may be generated into one link layer packet. This is described above with reference to FIGS. 6 and 7.

The broadcast signal transmitter performs physical layer processing of the link layer packet to generate the broadcast signal (S23040). The generated broadcast signal may be transmitted through the broadcast network. This is described above with reference to FIGS. 8 to 10.

Meanwhile, the broadcast signal receiver may perform a reverse operation of the broadcast signal transmitter. Hereinafter, a broadcast signal receiving method by the broadcast signal receiver will be described.

First, the broadcast signal receiver may receive the broadcast signal. In this case, the broadcast signal may include the LLS information. In this case, the broadcast signal receiver may acquire the LLS information from the broadcast signal. Thereafter, the broadcast signal receiver may parse the LLS information and control the operation of the broadcast signal receiver based on information included in the LLS information.

When a method for acquiring the LLS information from the broadcast signal by the broadcast signal receiver is described as an example, first, the broadcast signal receiver performs physical layer processing of a broadcast signal (or a signal frame of the broadcast signal) to output the link layer packets and performs link layer processing of the link layer packets to output the IP packets. In this case, the broadcast signal receiver may filter a specific IP packet stream. For example, the broadcast signal receiver may optionally output only the IP packets having the well-known IP address. In this case, the IP packets may include the LLS information. The broadcast signal receiver processes the IP packets to acquire the LLS information.

The broadcast signal receiver may parse the acquired LLS information and control the operation of the broadcast signal receiver based on the parsed LLS information. For example, the broadcast signal receiver parses the LLS information to acquire the SLT information. The acquired SLT information may be described below in FIGS. 11, 12, etc.

Each of the steps described in the above embodiments may be performed by hardware/processors. Each module/block/unit described in the above embodiments may operate as the hardware/processor. Further, the methods proposed by the present invention may be executed as the codes. The code may be written to a storage medium readable by the processor, and thus readable by a processor provided by the apparatus.

Although the drawings have been described for the sake of convenience of explanation, it is also possible to design a new embodiment to be implemented by merging the embodiments described in each drawing. Configurations and methods of the described embodiments may not be limitedly applied to the apparatus and the method according to the present invention, but all or some of the respective embodiments may be selectively combined and configured so as to be variously modified.

Meanwhile, the method proposed by the present invention may be implemented as a processor readable code in a processor readable recording medium provided in a network device. The processor readable recording medium includes all kinds of recording devices storing data which may be deciphered by a processor. Examples of the processor readable recording medium include a ROM, a RAM, a CD-ROM, a magnetic tape, a floppy disk, an optical data storage device, and the like and further include a device implemented as a type of a carrier wave such as transmission through the Internet. Further, the processor readable recording media may be stored and executed as codes which may be distributed in the computer system connected through a network and read by the processor in a distribution method.

Further, although the embodiments of the present invention have been illustrated and described above, the present invention is not limited to the aforementioned specific embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

It will be understood by those skilled in the art that various changes and modifications can be made therein without departing from the spirit or scope of the invention. Accordingly, it is intended that the present invention cover the modifications and variations of the present invention provided they come within the scope of the appended claims and their equivalents.

In the present specification, all apparatus and method inventions are herein mentioned and descriptions of both apparatus and method inventions can be supplemented and applied to each other.

MODE FOR INVENTION

Various embodiments are described in a best mode for carrying out the present invention.

INDUSTRIAL APPLICABILITY

The present invention is used in a series of broadcast signal transmission/reception fields.

It will be apparent to those skilled in the art that various changes and modifications can be made therein without departing from the spirit or scope of the invention. Accordingly, it is intended that the present invention cover the modifications and variations of the present invention provided they come within the scope of the appended claims and their equivalents.

The invention claimed is:

1. A broadcast signal transmitting method comprising:
generating service data;
generating service list table (SLT) information including bootstrapping information for access of service guide data;
generating service layer signaling (SLS) information providing session description information for at least one transport session carrying the service data;
processing the service data, the SLT information, and the SLS information into Internet Protocol (IP) packets;
generating link layer packets by link layer processing the IP packets; and
generating a broadcast signal by physical layer processing the link layer packets,
wherein the service guide data include a service fragment including information for a service and a content fragment including information for at least one content of the service,
wherein the service fragment includes service icon information providing uniform resource identifier (URI) information for a service icon used to represent the service in a broadcast signal receiver,
wherein the content fragment includes content icon information and preview information related to the at least one content,
wherein the content icon information provides URI information for a content icon used to represent the at least one content in the broadcast signal receiver, and
wherein the preview information includes preview icon information providing URI information for displaying at least one preview icon image in the broadcast signal receiver, description information providing a description of at least one preview data and preview content information providing URI information for displaying the at least one preview data in the broadcast signal receiver.

2. The broadcast signal transmitting method of claim 1, wherein the preview icon information includes at least one of mime type information of the at least one preview icon image, height information of the at least one preview icon image, width information of the at least one preview icon image and size information of the at least one preview icon image.

3. The broadcast signal transmitting method of claim 1, wherein the preview content information includes at least one of mime type information of the at least one preview data, height information of the at least one preview data, width information of the at least one preview data and size information of the at least one preview data.

4. A broadcast signal transmitter comprising:
a first layer processor configured to process service data, service list table (SLT) information including bootstrapping information for access of service guide data, and service layer signaling (SLS) information providing session description information for at least one transport session carrying the service data into Internet Protocol (IP) packets;
a second layer processor configured to generate link layer packets by link layer processing the IP packets; and
a third layer processor configured to generate a broadcast signal by physical layer processing the link layer packets,
wherein the service guide data include a service fragment including information for a service and a content fragment including information for at least one content of the service,
wherein the service fragment includes service icon information providing uniform resource identifier (URI) information for a service icon used to represent the service in a broadcast signal receiver,
wherein the content fragment includes content icon information and preview information related to the at least one content,
wherein the content icon information provides URI information for a content icon used to represent the at least one content in the broadcast signal receiver, and
wherein the preview information includes preview icon information providing URI information for displaying at least one preview icon image in the broadcast signal receiver, description information providing a description of at least one preview data and preview content information providing URI information for displaying the at least one preview data in the broadcast signal receiver.

5. The broadcast signal transmitter of claim 4, wherein the preview icon information includes at least one of mime type information of the at least one preview icon image, height information of the at least one preview icon image, width information of the at least one preview icon image and size information of the at least one preview icon image.

6. The broadcast signal transmitter of claim 4, wherein the preview content information includes at least one of mime type information of the at least one preview data, height information of the at least one preview data, width information of the at least one preview data and size information of the at least one preview data.

7. A broadcast signal receiver comprising:
a tuner configured to tune a broadcast signal including service data, service list table (SLT) information that includes bootstrapping information for access of service guide data, and service layer signaling (SLS) information providing session description information for at least one transport session carrying the service data,
wherein the service guide data include a service fragment including information for a service and a content fragment including information for at least one content of the service,
wherein the service fragment includes service icon information providing uniform resource identifier (URI) information for a service icon used to represent the service,
wherein the content fragment includes content icon information and preview information related to the at least one content, wherein the content icon information provides URI information for a content icon used to represent the at least one content, and wherein the preview information includes preview icon information providing URI information for at least one preview icon image, description information providing a description of at least one preview data and preview content information providing URI information for the at least one preview data;

a signaling parser configured to parse the SLT information and the SLS information in the broadcast signal;

a processor configured to acquire the service guide data based on the bootstrapping information; and a display unit configured to display service guide based on the service guide data, wherein the display unit further displays the at least one preview icon image based on the preview icon information and displays the at least one preview data based on the preview content information.

8. The broadcast signal receiver of claim 7, wherein a description of the at least one preview data is displayed with the at least one preview icon image.

9. The broadcast signal receiver of claim 7, wherein the preview icon information includes at least one of mime type information of the at least one preview icon image, height information of the at least one preview icon image, width information of the at least one preview icon image and size information of the at least one preview icon image.

10. The broadcast signal receiver of claim 7, wherein the preview content information includes at least one of mime type information of the at least one preview data, height information of the at least one preview data, width information of the at least one preview data and size information of the at least one preview data.

11. The broadcast signal receiver of claim 7, wherein a display size of the at least one preview icon image is different from a display size of the at least one preview data.

12. The broadcast signal receiver of claim 7, wherein the at least one preview data and the service guide are not displayed at the same time.

13. A broadcast signal receiving method comprising:

receiving a broadcast signal including service data, service list table (SLT) information that includes bootstrapping information for access of service guide data, and service layer signaling (SLS) information providing session description information for at least one transport session carrying the service data, wherein the service guide data include a service fragment including information for a service and a content fragment including information for at least one content of the service, wherein the service fragment includes service icon information providing uniform resource identifier (URI) information for a service icon used to represent the service, wherein the content fragment includes content icon information and preview information related to the at least one content, wherein the content icon information provides URI information for a content icon used to represent the at least one content, and wherein the preview information includes preview icon information providing URI information for at least one preview icon image, description information providing a description of at least one preview data and preview content information providing URI information for the at least one preview data;

parsing the SLT information and the SLS information in the broadcast signal;

acquiring the service guide data based on the bootstrapping information;

displaying service guide based on the service guide data;

displaying the at least one preview icon image based on the preview icon information; and displaying the at least one preview data based on the preview content information.

14. The broadcast signal receiving method of claim 13, wherein a description of the at least one preview data is displayed with the at least one preview icon image.

15. The broadcast signal receiving method of claim 13, wherein the preview icon information includes at least one of mime type information of the at least one preview icon image, height information of the at least one preview icon image, width information of the at least one preview icon image and size information of the at least one preview icon image.

16. The broadcast signal receiving method of claim 13, wherein the preview content information includes at least one of mime type information of the at least one preview data, height information of the at least one preview data, width information of the at least one preview data and size information of the at least one preview data.

17. The broadcast signal receiving method of claim 13, wherein a display size of the at least one preview icon image is different from a display size of the at least one preview data.

18. The broadcast signal receiving method of claim 13, wherein the at least one preview data and the service guide are not displayed at the same time.

* * * * *